US012204027B2

(12) United States Patent
Cani et al.

(10) Patent No.: US 12,204,027 B2
(45) Date of Patent: Jan. 21, 2025

(54) SAFETY LASER SCANNER AND RELATED METHOD FOR ADJUSTING DISTANCE MEASUREMENTS TO COMPENSATE FOR REFLECTIVE BACKGROUNDS

(71) Applicant: Datalogic IP Tech S.r.l., Calderara di Reno (IT)

(72) Inventors: Salvatore Valerio Cani, Bologna (IT); Enrico Lorenzoni, Zola Predosa (IT); Lorenzo Girotti, Bologna (IT)

(73) Assignee: Datalogic IP Tech S.r.l., Calderara di Reno (IT)

( * ) Notice: Subject to any disclaimer, the term of this patent is extended or adjusted under 35 U.S.C. 154(b) by 1062 days.

(21) Appl. No.: 17/112,457

(22) Filed: Dec. 4, 2020

(65) Prior Publication Data
US 2021/0173084 A1 Jun. 10, 2021

Related U.S. Application Data

(60) Provisional application No. 62/944,935, filed on Dec. 6, 2019.

(51) Int. Cl.
*G01S 17/42* (2006.01)
*G01S 7/48* (2006.01)
*G01S 7/481* (2006.01)
*G01S 7/4865* (2020.01)

(52) U.S. Cl.
CPC ............ *G01S 17/42* (2013.01); *G01S 7/4808* (2013.01); *G01S 7/4817* (2013.01); *G01S 7/4865* (2013.01)

(58) Field of Classification Search
None
See application file for complete search history.

(56) References Cited

U.S. PATENT DOCUMENTS

| | | | |
|---|---|---|---|
| 6,873,406 B1 * | 3/2005 | Hines | G01S 7/4808 356/5.01 |
| 7,589,826 B2 | 9/2009 | Mack et al. | |
| 9,964,437 B2 | 5/2018 | Lorenzoni et al. | |
| 10,048,120 B2 | 8/2018 | Corrain et al. | |
| 10,061,021 B2 | 8/2018 | Faetani et al. | |
| 2013/0301030 A1 | 11/2013 | Hulm et al. | |
| 2016/0188977 A1 * | 6/2016 | Kearns | H04N 7/185 348/113 |
| 2017/0293021 A1 * | 10/2017 | Franzreb | G01S 7/4817 |

(Continued)

FOREIGN PATENT DOCUMENTS

DE  10 2013 100 696 B3  11/2013
DE  20 2017 106 071 U1   2/2018

(Continued)

*Primary Examiner* — Isam A Alsomiri
*Assistant Examiner* — Sanjida Naser
(74) *Attorney, Agent, or Firm* — Foley & Lardner LLP

(57) ABSTRACT

A distance measuring device is disclosed that includes a controller operably coupled with a receiver to receive different amplification channels. The controller includes a time of flight core configured to determine time of flight information for the light pulse; and a decider block configured to determine a measurement correction value for the device based on a determination of a presence of a reflective background that is different than a measurement correction value selected for the device when there exists a diffuse background or an absence of a background into a reading field.

20 Claims, 20 Drawing Sheets

(56) References Cited

U.S. PATENT DOCUMENTS

| 2018/0356502 | A1 | | 12/2018 | Hinderling et al. |
| 2019/0212421 | A1 | * | 7/2019 | Honkanen ............. G01S 7/4861 |
| 2019/0271767 | A1 | * | 9/2019 | Keilaf ................... G01S 7/4816 |
| 2019/0318177 | A1 | * | 10/2019 | Steinberg ................ G01S 7/484 |
| 2019/0369252 | A1 | | 12/2019 | Girotti |

FOREIGN PATENT DOCUMENTS

| DE | 11 2017 006 703 T5 | | 9/2019 | |
| EP | 2 315 053 A2 | | 4/2011 | |
| EP | 2 182 377 B1 | | 9/2012 | |
| EP | 3 246 729 B1 | | 4/2019 | |
| GB | 2471965 A | * | 1/2011 | ........... G01S 13/106 |
| IT | 102016000070878 A1 | | 1/2018 | |
| IT | 102016000100444 A1 | | 4/2018 | |
| IT | 102016000132849 A1 | | 6/2018 | |

* cited by examiner

SAFETY LASER SCANNER AND RELATED METHOD FOR ADJUSTING DISTANCE MEASUREMENTS TO COMPENSATE FOR REFLECTIVE BACKGROUNDS

PRIOR APPLICATION

This application claims the benefit of U.S. Provisional Application No. 62/944,935, filed Dec. 6, 2019, and entitled SAFETY LASER SCANNER AND RELATED METHOD FOR ADJUSTING DISTANCE MEASUREMENTS TO COMPENSATE FOR REFLECTIVE BACKGROUNDS, the disclosure of which is incorporated by reference herein in its entirety.

TECHNICAL FIELD

The present disclosure relates generally to optical sensors, and more particularly, to laser scanners, optical systems for laser scanners, and laser devices including time-of-flight measuring devices with no scanning mechanisms.

BACKGROUND

Optical sensors are currently used in a number of applications for the detection of objects. One type of optical sensor is a laser scanner, in which a collimated light beam generated by a laser source periodically moves over an area to be monitored. The light beam may be moved by a scanning mirror or other deflection unit which rotates or oscillates to direct light beams over the area. Using the angular position of the scanning mirror, the angular position of an object may be determined. Using the time of flight for pulses of light reflected by an object and the speed of light, the distance of an object may also be determined. From the angular and distance measurements, objects may be detected in the area in two-dimensional polar coordinates, for example.

In addition to object measurement applications, laser scanners may also be used in safety applications for monitoring a source of danger (e.g., a machine, robot, vehicle, etc.). In such safety applications, a laser scanner (also referred to as a "safety laser scanner" or "SLS") may be positioned to monitor an area proximate the source of danger which should not be entered by personnel. If a person or object enters the monitored area when the laser scanner is active, the laser scanner may generate an alarm and/or mitigate the source of danger (e.g., shutdown a running machine).

In environments where the background may have reflective surfaces, measurements may experience interference from reflections off the reflective surfaces. Currently, a solution to address the reflective background effect on the safety laser is to measure the distance of a generic object further away than the real distance of the detected object. This may cause a fail-to-danger situation in case of the detected object is near the boundary of the safety area.

As shown in FIG. 1A, a safety laser scanner (SLS) 100 may have a pre-defined safety area 50 that may be defined by a user to have a particular angular region and distance from the SLS 100 according to the desired needs. In this situation, the object 55 may enter the safety area 50 near the boundary. In this specific case, the SLS 100 should enable its safety output because the real position of the object 55 is located within the safety area 50; however, measurement distortion (in part from the reflective background 58) may cause an incorrectly estimated distance which makes the object 55 seem outside the safety area 50. As a result, a dangerous situation may occur in which the SLS 100 does not enable its safety output when it otherwise should be enabled.

FIG. 1B shows a common solution to address this situation in which the manufacturer of the SLS 100 may set a pre-defined "additional distance" 52 (e.g., 40 cm) to the user's desired distance for the boundary of the safety area 50 to achieve an extended safety area 54. Consequently, the extended safety area 54 may have an extended distance to compensate for the presence of a reflective target in the monitored area. Therefore, the additional distance 52 is a limitation for the user as the user is forced to set a larger safety-area than necessary (e.g., SafetyArea=DesiredSafetyArea+Additional Distance) or reduce the effective maximum area that can be used (EffectiveMaxArea=MaxSafetyArea−Additional Distance).

BRIEF SUMMARY

A distance measuring device comprises a transmitter configured to generate a light pulse; a receiver connected to different amplification channels; a controller operably coupled with the receiver to receive the different amplification channels. The controller includes: a time of flight core configured to determine time of flight information for the light pulse; and a decider block configured to determine a measurement correction value for the device based on a determination of a presence of a reflective background that is different than a measurement correction value selected for the device when there exists a diffuse background or an absence of a background into a reading field.

A method of measuring a distance of an object with a reflective background comprises generating a light pulse with a transmitter, determining time of flight information with a time of flight core of a controller that receives different amplification channels via a receiver, and determining, via a decider block of the controller, a measurement correction value for the device based on a determination of a presence of a reflective background that is different than a measurement correction value selected for the device when there exists a diffuse background or an absence of a background into a reading field.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

One or more implementations of the present disclosure are directed to laser scanners and optical systems for laser scanners which may be used in any number of applications, such as safety applications. The optical system of one or more implementations may include an emitting or transmission subsystem which scans a scanning area using a laser beam. The optical system may also include a reception subsystem which detects light (visible or nonvisible, more generally "electromagnetic radiation") scattered back by an object positioned inside the scanning area. Embodiments of the disclosure include a processor (e.g., FPGA) configured to recognize the scenario of background reflections and to correct corrupted distance measurements in a safety-oriented way and therefore reduce the additional distance that may be added to by the manufacturer to the safety area. As a result, the performance of the SLS may be improved by being able to monitor more heterogeneous scenarios (e.g., with or without reflective backgrounds) with a reduced amount of additional distance needed to be added to the distance measurements by the SLS. As used herein, a reflective object may be defined by a threshold reflectance value (e.g., greater than 90%) whereas the object is otherwise a diffusive object below the threshold reflectance value (e.g., less than or equal to 90%).

The following description describes embodiments including a laser scanner (e.g., a safety laser scanner); however, this is done for illustration purposes and is not limited to only laser scanning devices or systems. For example, embodiments of the disclosure may also include time-of-flight distance measuring devices, such as an LED TOF measuring with an array of pixels (e.g., 8×8 pixel receiver) and an LED light generator as the light source. Some embodiments may also include a 3D TOF camera, which may include an LED light source with a pixel array as the receiver. Such embodiments may have different amplification levels to the signal received by the array, and as such specific numbers provided herein for thresholds and other definitions are non-limiting and may be different depending on the particular application, environment, device characteristics, tolerances, user preferences, etc.

Figure 1A:
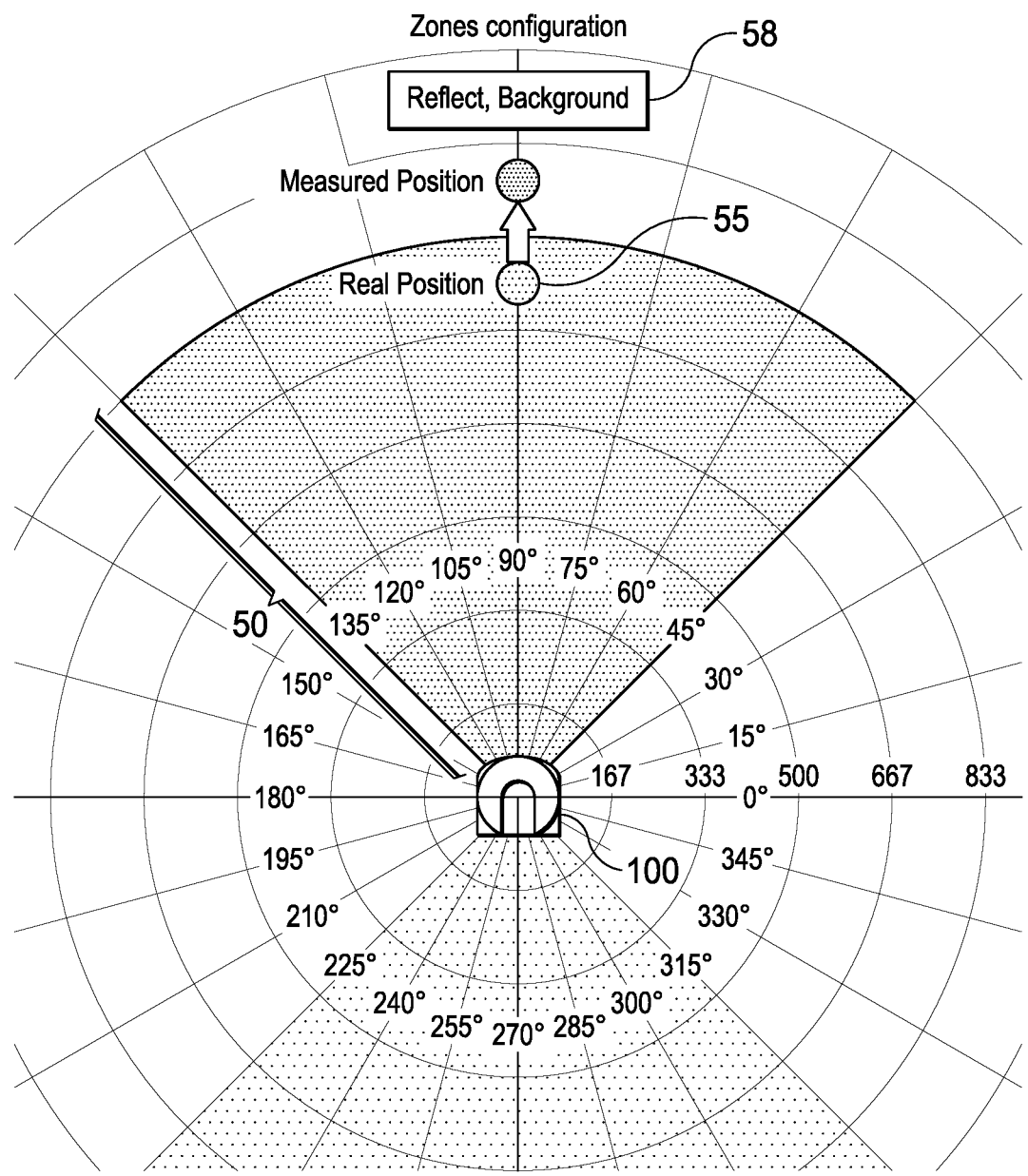
FIGS. 1A and 1B are zone configuration charts for a safety laser scanner.
Figure 1B:
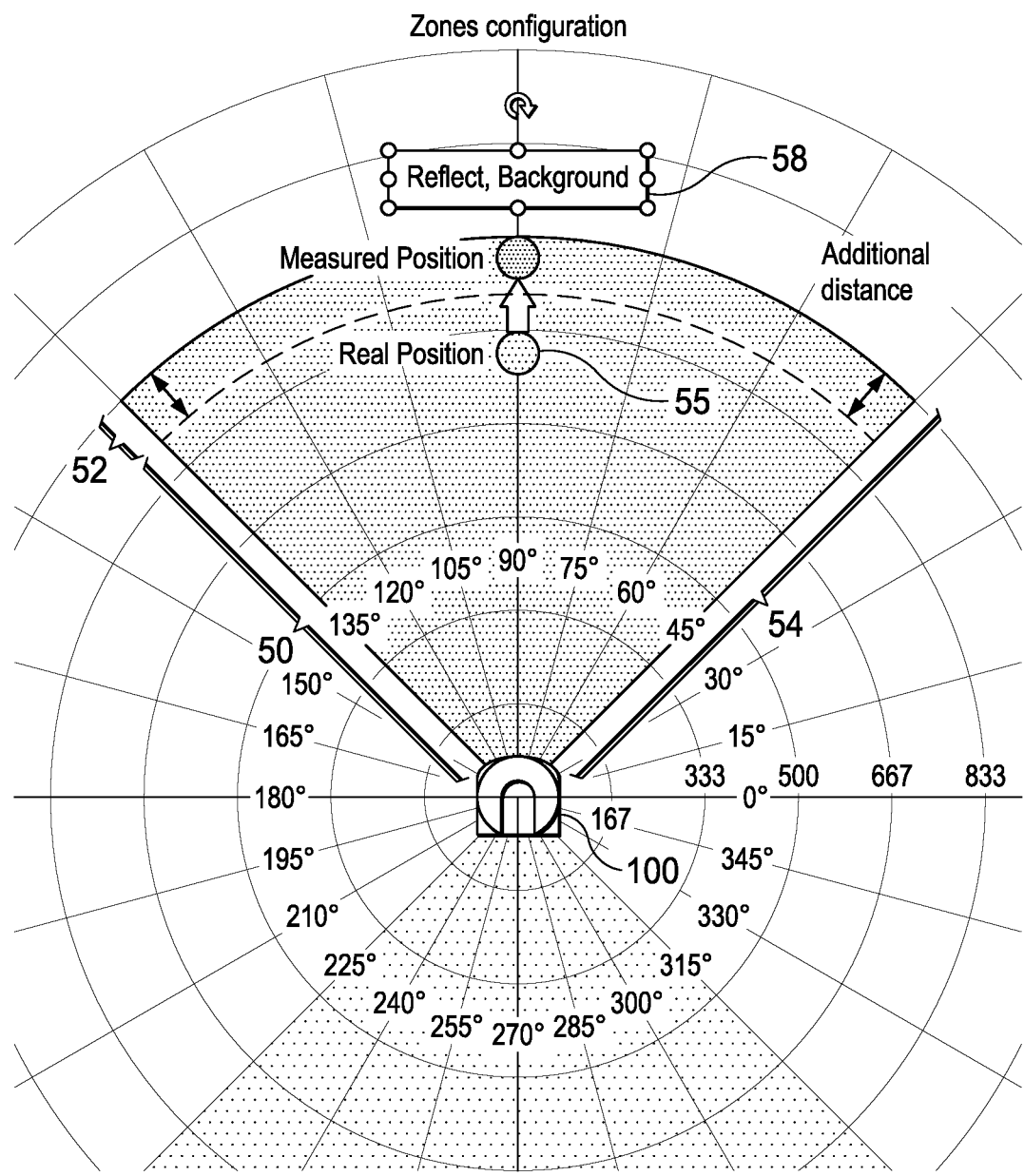
Figure 2A:
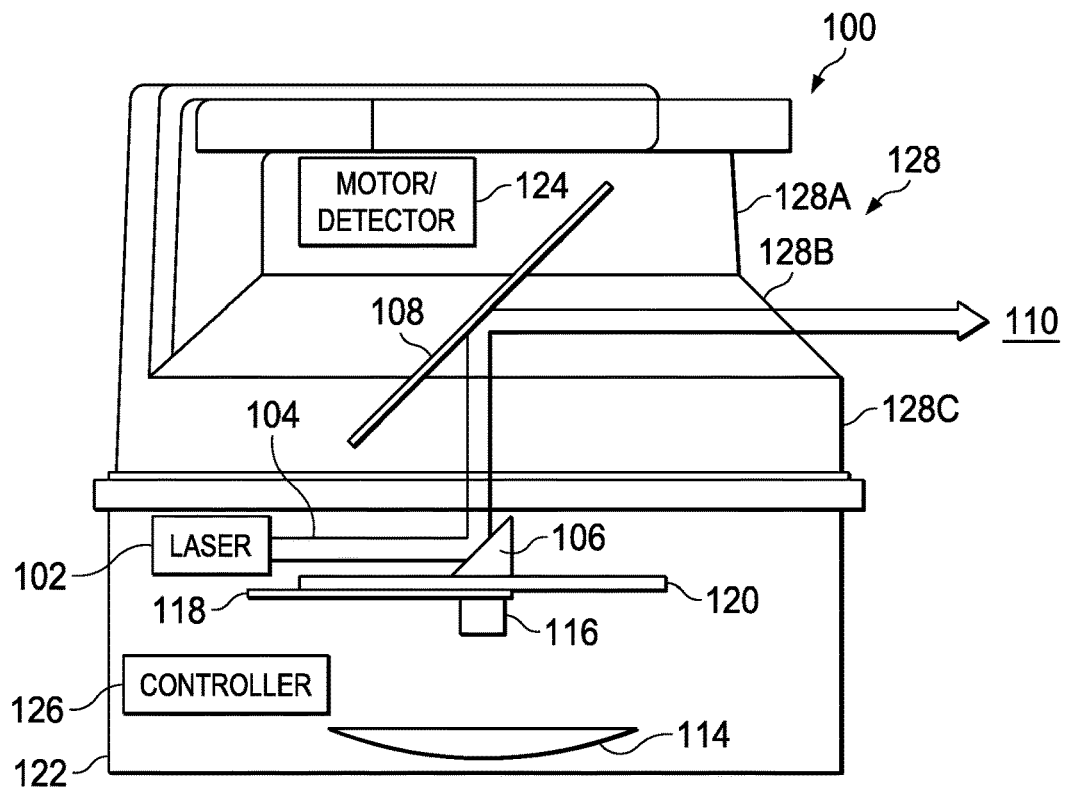
FIGS. 2A and 2B show a laser scanner according to an embodiment of the disclosure.
Figure 2B:
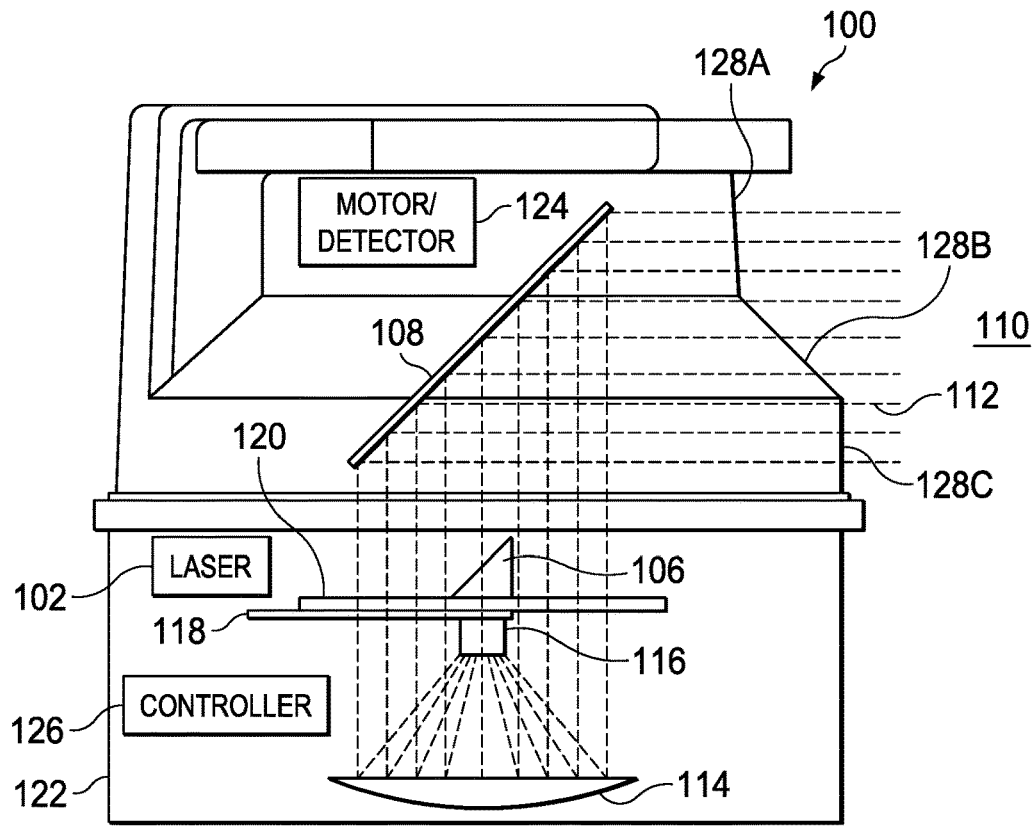

FIGS. 2A and 2B show a laser scanner 100 according to an embodiment of the disclosure. As shown in FIG. 2A, the laser scanner 100 includes a light source or emitter 102, such as a laser diode, that is configured to emit a collimated beam 104 in the form of short (e.g., few nanoseconds) light pulses (e.g., laser) toward a bending or folding mirror 106, which reflects the beam toward a scanning mirror 108. The light source 102 may have an emission band in the near infrared (NIR) range and may have a peak wavelength of 905 nanometers, for example. In some embodiments, other laser sources (e.g., red) may be employed. The scanning mirror 108 directs the beam toward a scanning area 110.

As shown in FIG. 2B, if an object is present in the scanning area 110, diffuse light 112 that is back-reflected by the object is reflected by the scanning mirror 108, and directed downward toward collecting optics which include a concave collecting reflector or mirror 114. The collecting mirror 114 is positioned below the folding mirror 106 to direct and focus light from the scanning mirror 108 which has been reflected from one or more objects positioned within the scanning area 110 toward a light detector 116 (e.g., avalanche photodiode, other photodetector) which is supported by a support arm 118.

The collecting mirror 114 may be formed of a plastic material (e.g., polycarbonate (PC), polymethylmethacrylate (PMMA), cyclic olefin polymer (COP)) which has a one or more layers of a reflective coating thereon to provide a reflective surface. The reflective coating may include a metal layer such as aluminum or gold, optionally with a protective layer of a transparent material (e.g., $SiO_2$). Another example of a reflective coating is a dielectric multilayer coating that has a very high (e.g., 99%) reflectivity for a specific wavelength band. The collecting mirror 114 may be formed from a material with low water absorption properties which may reduce the likelihood that a reflective coating will peel off during the lifetime of the laser scanner 100. In some implementations, the collecting mirror 114 is opaque to wavelengths of light emitted by the light source 102 so that the small fraction of light which passes through the reflective surface is absorbed by the material and is not diffused inside a housing 122 of the laser scanner 100.

The laser scanner 100 also includes a dichroic or interference filter 120 positioned above (as shown) the light detector 116 to filter the returned light 112 from the scanning mirror 108 before the returned light reaches the collecting mirror 114. The interference filter 120 transmits spectral bands which correspond to the light emitted by the light source 102 and reflects spectral bands outside of the spectral band emitted by the light source. Since the interference filter 120 is placed in the optical path before the collecting mirror 114, the interference filter may be designed to accept rays with an relatively small incidence angle $A_2$, such as an incidence angle of only a few degrees (e.g., 3 degrees, 5 degrees, 10 degrees, 20 degrees). By allowing the acceptance angle of the interference filter 120 to be relatively small, the interference filter may more effectively filter the scattered light from within the housing 122 of the laser scanner 100, thereby improving the signal to noise ratio.

In some implementations, the interference filter 120 is made with a colored class filter substrate having a single or multilayer coating on one or both sides thereof. The glass material may be, for example, Schott RG830 glass offered by Schott Corporation or Hoya IR-83 glass offered by Hoya Corporation. The interference filter 120 may in some implementations have a black appearance because the glass material may not be transparent to visible light but has a relatively high transmittance (e.g., greater than 90%) in the NIR region emitted by the light source 102. Additional layer(s) may be operative to filter wavelengths of light beyond the emission band of the light source 102. The collecting mirror 114 and interference filter 120 are discussed in further detail below.

The laser scanner 100 may also include a motor/detector 124 which is operatively coupled to the scanning mirror 108 to drive the scanning mirror in continuous rotation about a vertical axis of rotation. For example, in some implementations the scanning mirror 108 may rotate at an approximate speed of 2000 rotations per minute. The angular position of the scanning mirror 108 may be detected by the motor/detector 124, which may include an angular position detector such as an encoder. The light beam 104 generated by the light source 102 in the form of short pulses therefore scans the scanning area 110 generated by the rotational movement. In instances where there is an object in the scanning area 110 and a reflected light signal is detected by the light detector 116, the angular position of the object in the scanning area 110 may be derived from the angular position of the scanning mirror 108, as detected by the motor/detector 124.

The time of flight of individual laser light pulses from their transmission until the reception after reflection on the object in the scanning area 110 may be determined, which allows for calculation of the distance of the object from the laser scanner 100 based on the known speed of light. This evaluation may be performed by a controller 126 which is operatively coupled to the light source 102, the light detector 116, and/or the motor/detector 124.

The controller 126 may be any suitable controller, and may include one or more central processing units (CPUs), microprocessors, digital signal processors (DSPs), application-specific integrated circuits (ASICs), field programmable gate arrays (FPGAs), programmable logic controllers (PLCs), etc. The controller 126 may include or be operatively coupled to non-transitory processor-readable storage media (e.g., RAM, ROM, flash), input/output systems, wired/wireless communication systems, etc., as is known in the art.

The components of the laser scanner 100 may be arranged in the housing 122 which includes a protective window 128 in the area where light enters and leaves the laser scanner. The protective window 128 may be made of a plastic material (e.g., polycarbonate, other polymer material) which has a high transmittance of light for wavelengths which are emitted by the light source 102. In some implementations, the visual appearance of the window 128 may be black, which filters visible light and which hides the internal components of the laser scanner 100. The window 128 may have rotation symmetry about the vertical axis of rotation of the scanning mirror 108.

In some implementations, the protective window 128 has a profile which is divided into an upper section 128A, a middle section 128B, and a lower section 128C. The middle section 128B of the protective window 128 may be tilted with a relatively large angle (e.g., 30 degrees, 45 degrees) with respect to the vertical axis, which provides at least two benefits. First, for at least some coating processes the inner and outer surface of the window 128 can be effectively coated with an anti-reflective coating only if the tilt of the window is above a certain angle (e.g., more than 30 degrees). This is because the dielectric material in the vacuum deposition process comes from a direction which is parallel to the vertical symmetry axis and cannot substantially stack on vertical or nearly vertical surfaces. Second, by providing the tilted middle section 128B of the protective window 128, the small fraction of light transmitted from the light source 102 which undergoes specular reflection is directed downward away from the optical path of the receiving subsystem and can be stopped by a light absorbing material positioned within the housing 122 of the laser scanner 100.

By utilizing the collecting reflector 114 rather than a lens for the concentrator optics, several limitations of conventional collecting lenses may be mitigated. For example, the large numerical aperture requirements typically result in a relatively thick lens with a short radius of curvature. In such instances, the irradiance distribution spot at the focus point of the lens may be strongly affected by inhomogeneities in the lens material. Such is an issue when the lens is made of glass, and may be worse in cases where the lens is made from a plastic material. Additionally, due to the relatively large thickness of the lens, the birefringence of the lens material may introduce aberrations in the spot image at the focal plane of the lens. The thickness of the lens also increases the length of the optical system, which results in a larger housing requirement for the laser scanner. The optical path length (OPL) of the optical system of the laser scanner 100 may be substantially shorter than the OPL of a system which utilizes a thick lens. Further, the index of refraction of a lens is temperature dependent and, in combination with the thermal expansion of the lens material, the focus position of the lens will shift due to variations in temperature.

Utilizing the reflector 114 as the collecting optics for the laser scanner 100 rather than a thick lens has further advantages. For example, the reflector 114 may have a relatively thin profile compared to a lens, due to the smaller thickness and larger radius of curvature of the reflector. Additionally, shapes having a larger radius of curvature are easier to mold with a given precision. Additionally, by using a reflector, the focus configuration is independent of the refractive index of the material which, as noted above, may change due to changes in environmental conditions. Further, when using a reflector the quality of the spot on the plane of the light detector 116 is not affected by material inhomogeneities, internal stresses, bubbles and birefringence. Moreover, a reflector may be made of only one optical surface and the mold for the reflector may only require one optical mold insert, compared to two optical mold inserts required for using a lens for the collecting optics.

Additionally, in some instances, a reflector with a reflective coating (e.g., aluminum coating, silver coating, gold coating) may have a higher flux transfer efficiency than a lens, even when the lens has an anti-reflective coating on both sides thereof. Advantageously, during manufacturing a reflective surface may be coated with a layer of material by a single coating process, whereas an effective anti-reflective coating on a lens may require multiple coating processes (e.g., application of multiple coating layers on one or both sides of a lens).

Different configurations and details regarding the construction of a safety laser scanner are contemplated and not limited to the specific configuration shown in FIGS. 2A and 2B. For example, additional features and configurations are described in the following patents: U.S. Pat. No. 10,061,021, filed Jul. 6, 2016, issued Aug. 28, 2018; U.S. Pat. No. 9,964,437, filed May 3, 2016, issued May 8, 2018; and U.S. Pat. No. 10,048,120, filed May 3, 2016, issued Aug. 14, 2018, the disclosure of each of which is incorporated by reference herein in their entirety.

Figure 3:
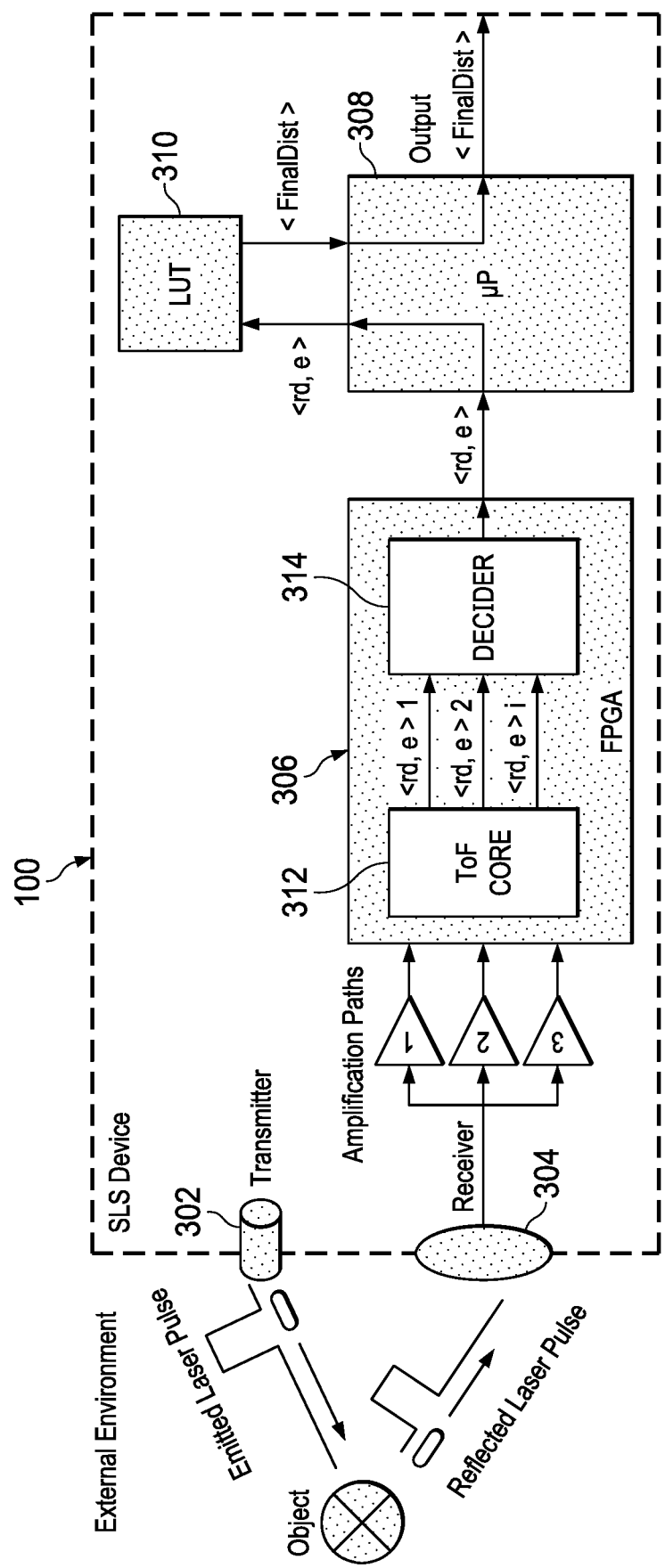
FIG. 3 is a simplified schematic block diagram of the laser scanner of FIG. 2.

FIG. 3 is a schematic block diagram of the SLS 100 according to an embodiment of the disclosure. As discussed above, the SLS 100 may belong to the safety device family and is configured to scan a selected area and detect a possible intrusion by a generic object in order to activate the safety output (OSSD) to prevent dangerous conditions. The SLS 100 includes a transmitter 302, a receiver 304, and controller (which may comprise an FPGA 306, microprocessor 308, and look-up table (LUT) 310). The FPGA 306 may include a time-of-flight (TOF) core 312 and a decider block 314. The time of flight core 312 may be configured to determine time of flight information for the light pulse. The decider block 314 may (e.g., in cooperation with the TOF core 312, microprocessor 308, and LUT 310) be configured to determine a measurement correction value for the device based on a determination of a presence of a reflective background that is different than a measurement correction value selected for the device when there exists a diffuse background or an absence of a background into a reading field. The measurement correction value may also be referred to herein as a distance value or a variation thereof. It should be understood that memory (e.g., volatile memory and non-volatile memory) may also be included to facilitate data storage and transfer during operation.

The SLS 100 may be configured to calculate distance measurements using the infrared laser pulsed Time-of-Flight method. As discussed above, a light source emitting an infrared laser pulse may be reflected by a rotating mirror; the final stage is made up of a photodetector that capture the return pulse after it is reflected by an object in the scene. The photodetector may be connected to a plurality of different amplification paths (i.e., channels) because it is necessary to manage a high dynamic of the signals received related to each different environment situation. In this example, three channels are shown but a different number of channels may be utilized (e.g., two or more).

Each of these channels may be characterized by an operating range of distance and target reflectance. Examples of such characterization may include (other defined ranges and distances are also contemplated):

a. Auxiliary Channel (channel 1): for short distances (e.g., from Min Distance up to 2500 mm) and target reflectance from 1.8% to 90%.
  b. Diffusive Channel (channel 2): for long distances (e.g., from 2000 mm to Max Distance) and target reflectance from 1.8% to 90%.
  c. Reflective Channel (channel 3): for all distances (e.g., from Min Distance to Max Distance) and target reflectance from 90% to 1000% or higher.

Figure 4:
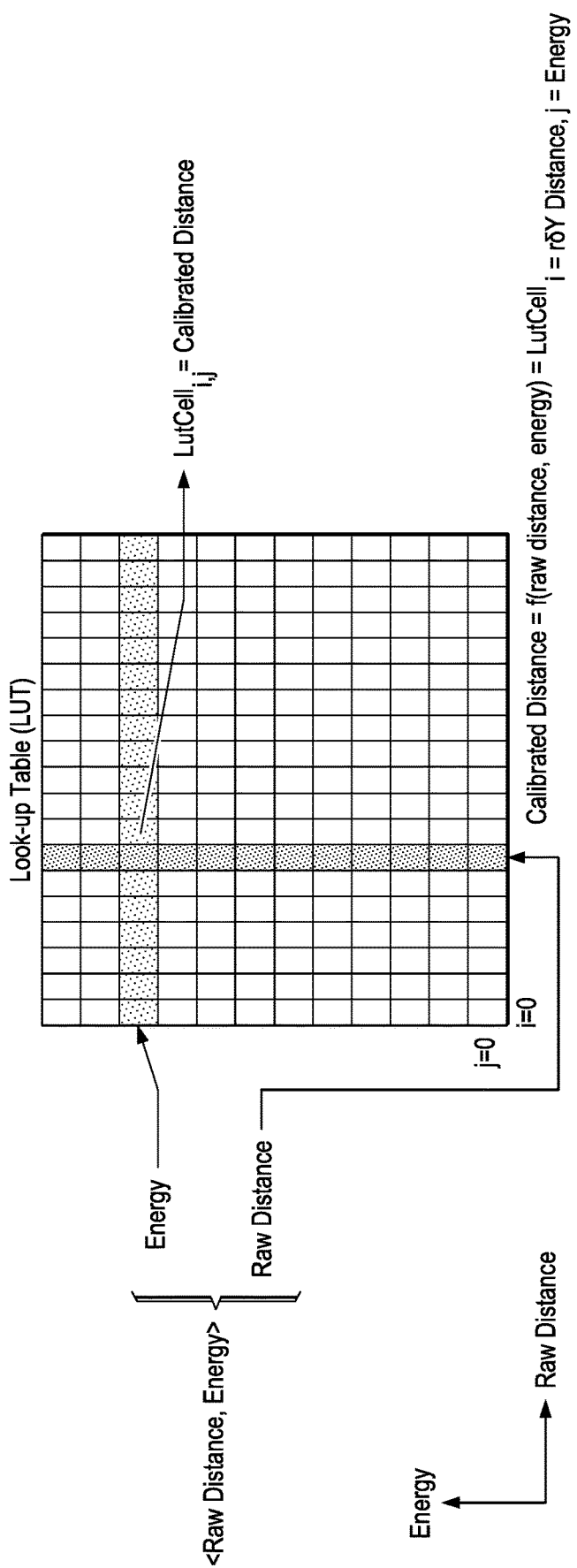
FIG. 4 is a look-up table for energy/raw distance pairs to arrive at a calibrated distance.

The channels may be operably coupled in parallel to the FPGA 306 (e.g., to the TOF Core) which processes the signals and returns the pair of values <raw distance, energy> (indicated as <rd,e>) for each of them. As a result, three pairs of values <rd,e> may be obtained simultaneously for each laser pulse that are evaluated by the decider block 314 (implemented in FPGA 306) which may select and return the desired (e.g., optimal) pair of values to the microprocessor 308 based on the distance and target reflectance specific situation. This final pair of values is used by the microprocessor 308 to address the two-dimensional calibration LUT 310 containing the calibrated distance value and which returns the final distance from the cell at the intersection of the row/column (i.e., energy/raw distance) of the LUT 310 as shown in FIG. 4.

Final Distance=$F_{Lut}$ (raw distance,energy)=
$LUT_{i=rawDistance, j=Energy}$

Figure 5:
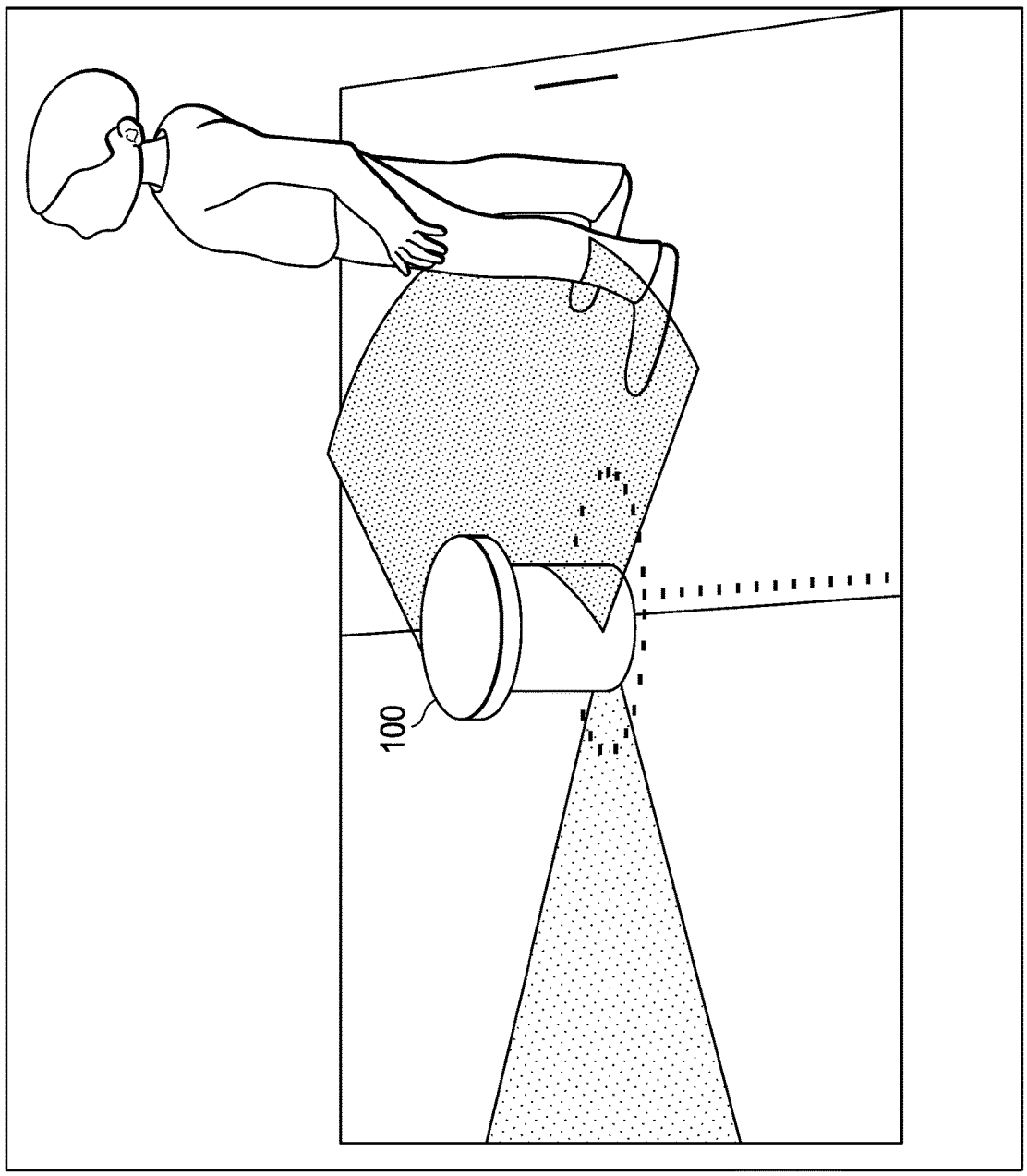
FIG. 5 shows a safety laser scanner environment for detecting the presence of an object, such as a person.
Figure 6:
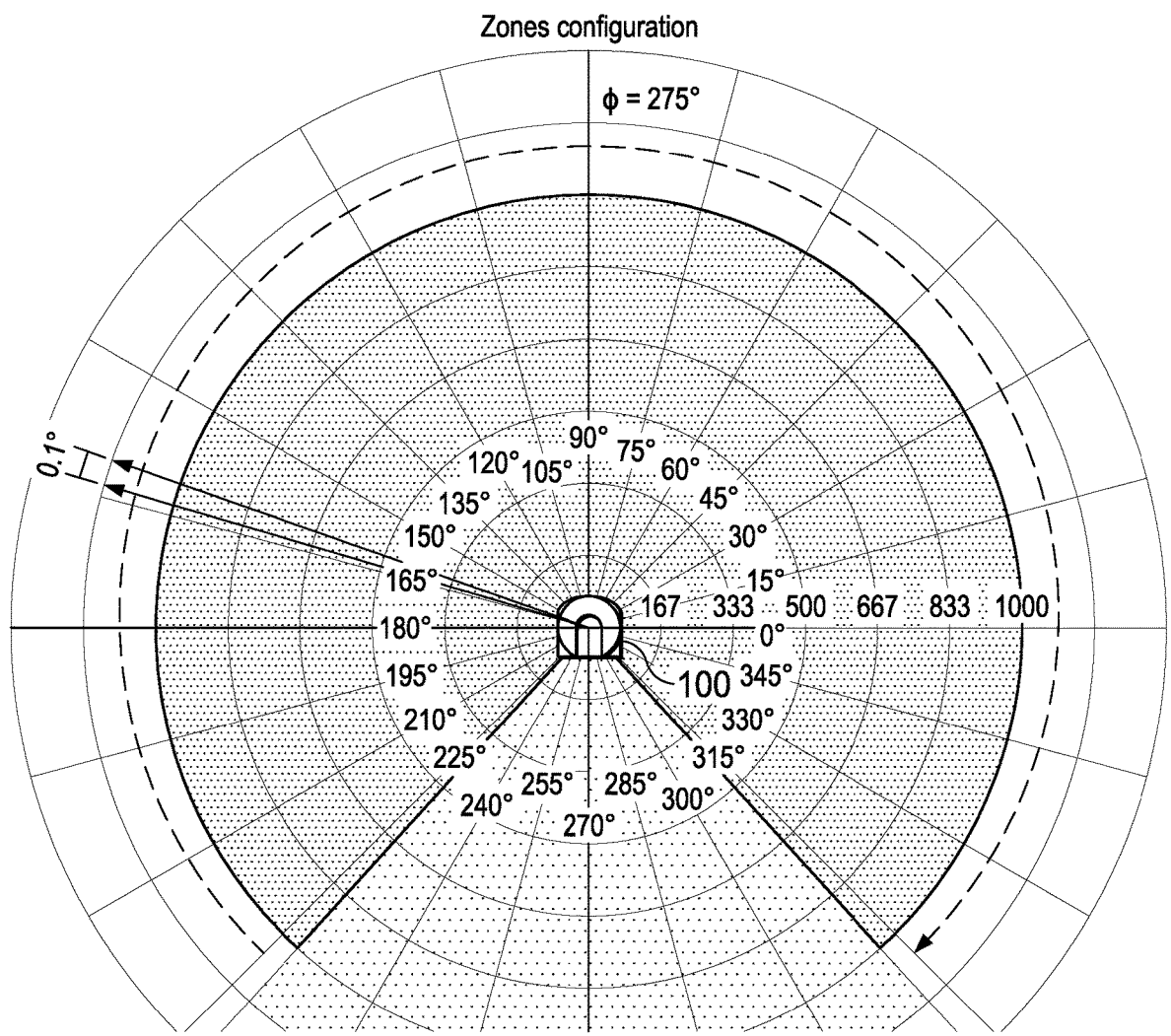
FIGS. 6 and 7 are a zone configuration chart for a safety laser scanner according to embodiments of the disclosure.

The light source may generate a pulse for every 0.1° at which a distance measurement is calculated. The full monitored area may be a flat surface of 275° circular-sector with an angular resolution of 0.1° (FIGS. 5-6). In this way for each full mirror rotation, a total number of distance measurements may be obtained which completely describe the monitored scenario (e.g., $N_{Meas}$=275*10=2750).

Environment Scenario Matching

Figure 7:
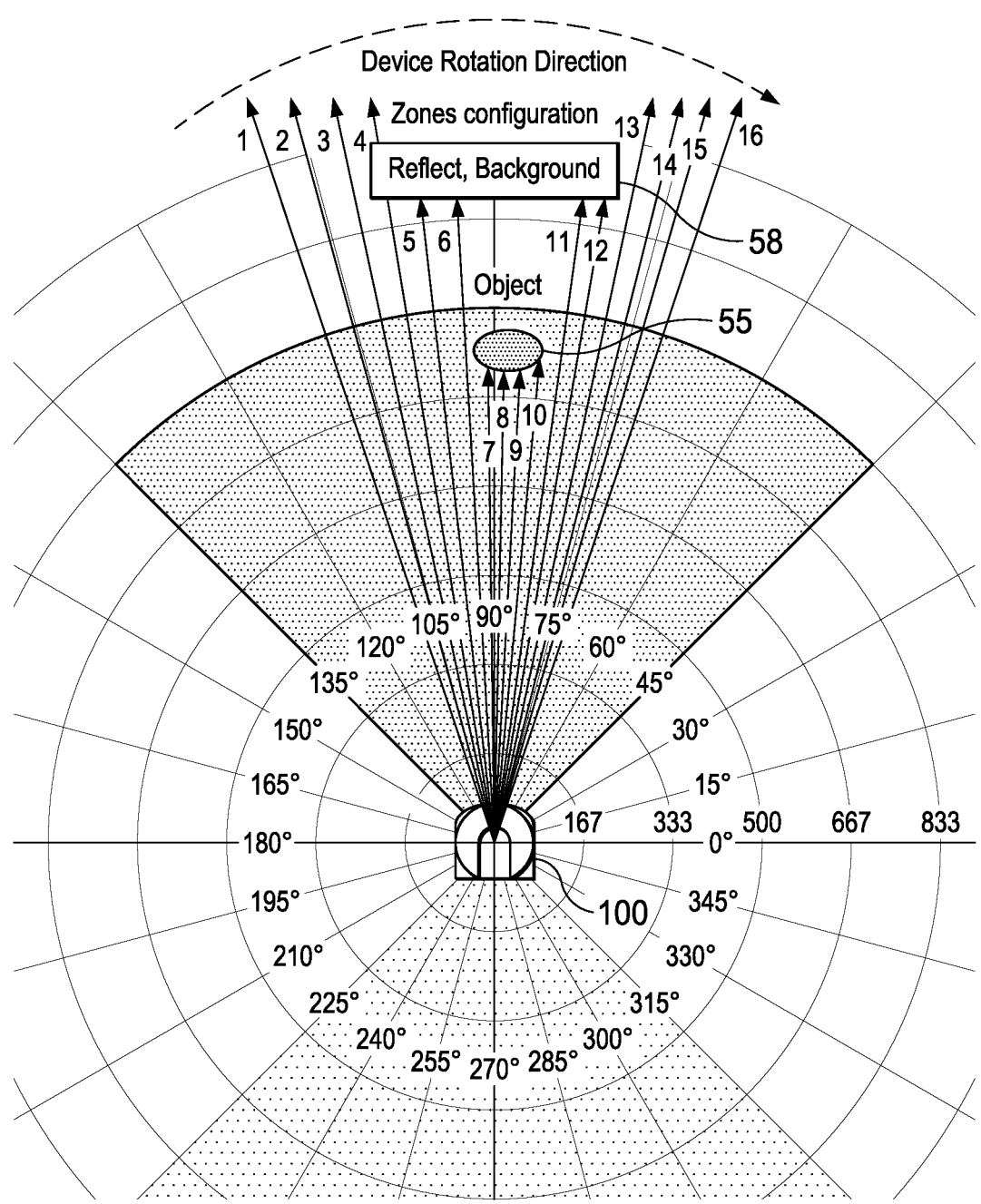

FIG. 7 shows an example scenario showing an operation of the SLS 100 according to an embodiment of the disclosure.

a. No Target Detected (No Object, arrows 1, 2, 3, 4)
  b. High Reflective Target (Background, arrows 5, 6)
  c. Diffusive Target (Object, arrow 7, 8, 9, 10)
  d. High Reflective Target (Background, arrows 11, 12)
  e. No Target Detected (No Object, arrows 13, 14, 15, 16)

To describe the scene in digital mode, a '1' may be set for each incident laser beam to a reflective target otherwise a '0' may be set for a diffusive target. A pattern under investigation may be evaluated by analyzing a sequence of values related to consecutive pulses rather than data relating to a single laser pulse (0.1°). Therefore, the sequence of <distance, energy> values may be buffered in the FPGA for a laser-pulse number $N_{Buff}$ and for each channel. The i-th buffer element (which corresponds to the laser beam i-th) of the ch-th channel may be indicated as $<rd, e>_{i=bufferSample, ch=numberChannel}$.

| N. LaserBeam | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Refl/Diff | x | x | X | X | 1 | 1 | 0 | 0 | 0 | 0 | 1 | 1 | x | x | x | x |

Figure 8:
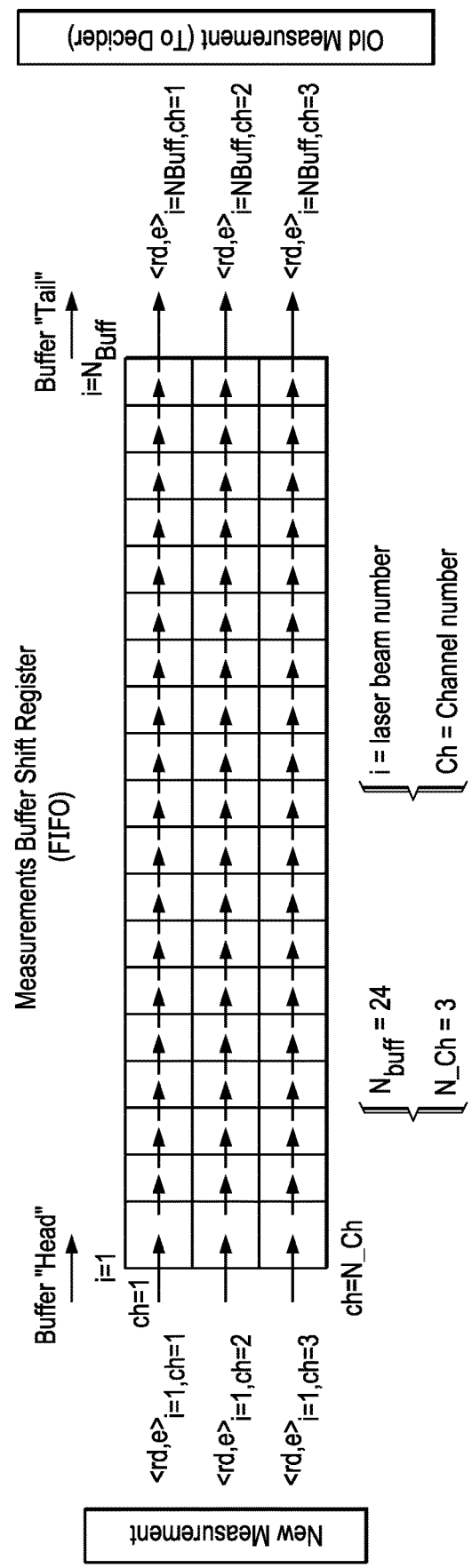
FIG. 8 shows a measurement buffer shift register for the channel measurements according to an embodiment of the disclosure.

A larger buffer allows a more effective and flexible processing, on the other hand the length of the buffer may affect the complexity of the FPGA architecture. For $N_{Buff}$=24 length and a FIFO buffer architecture may be selected, but other sizes and configurations are contemplated. For each new laser-pulse, and therefore for each new value <raw distance, energy>, the older entry is removed (buffer "tail") from the last position and the new element is added on the first position (buffer "head"). This will make the result of the processing data related to the first pair of $<rd, e>_{i=1, ch=*}$ values available only when the buffer has been filled by all the elements ($N_{Buff}$=24→$<rd, e>_{i=NBuff, ch=*}$ values) (see FIG. 8). In this way, a delay equal to $N_{Buff}$ samples may be introduced, which is negligible compared to the response time of the device; on the other hand, this method may enable the measurement values to be corrected in real-time.

The first step in the recognition process may be to detect the presence of the reflector target ("reflector detector"). To achieve this, various methods may be implemented depending on the channel selected by the decider block 314 in the FPGA 306. A mix-method may be employed based on an energy threshold value (on the reflective channel) (see FIG. 10) and/or the characteristic curve of the energy value ratio (Ch.Diffusive/Ch.Reflective) (see FIG. 9).

Figure 11:
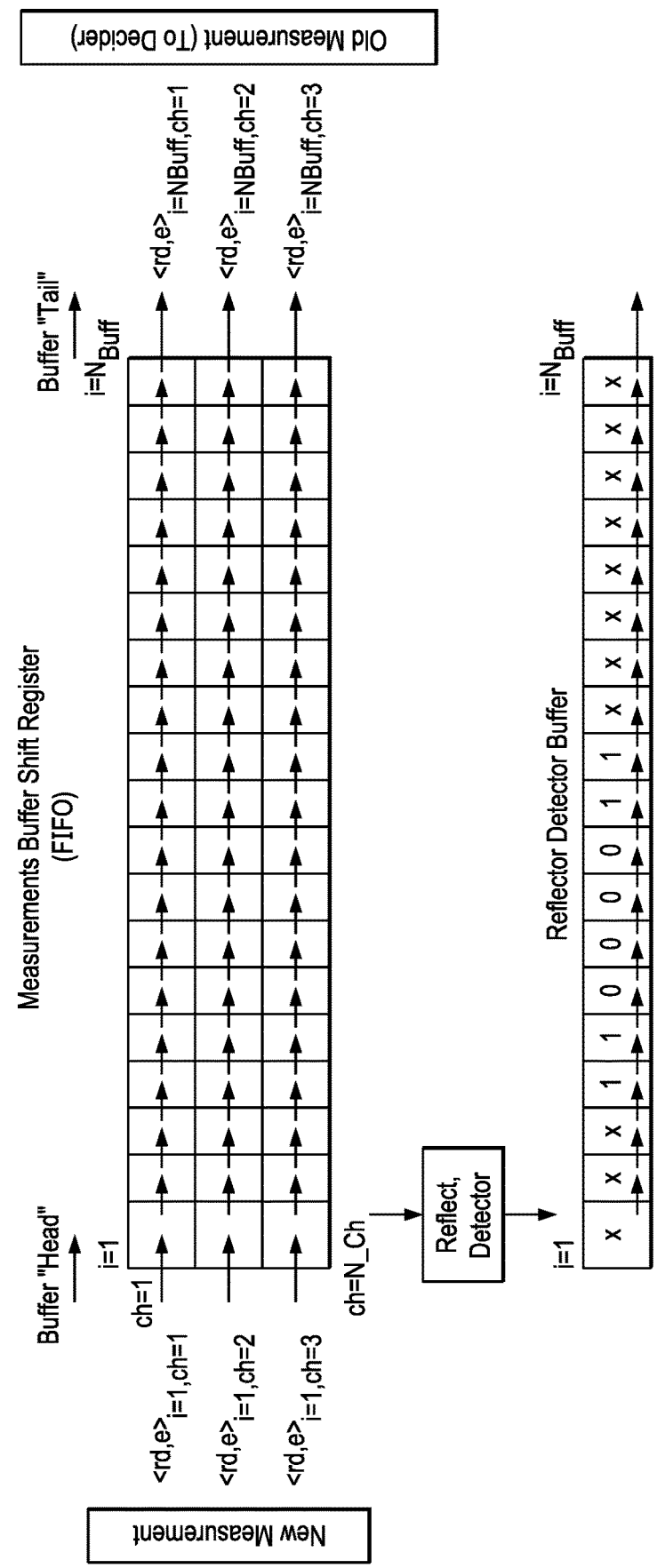
FIGS. 11 and 14 are measurement buffer shift registers according to an embodiment of the disclosure.
Figure 12:
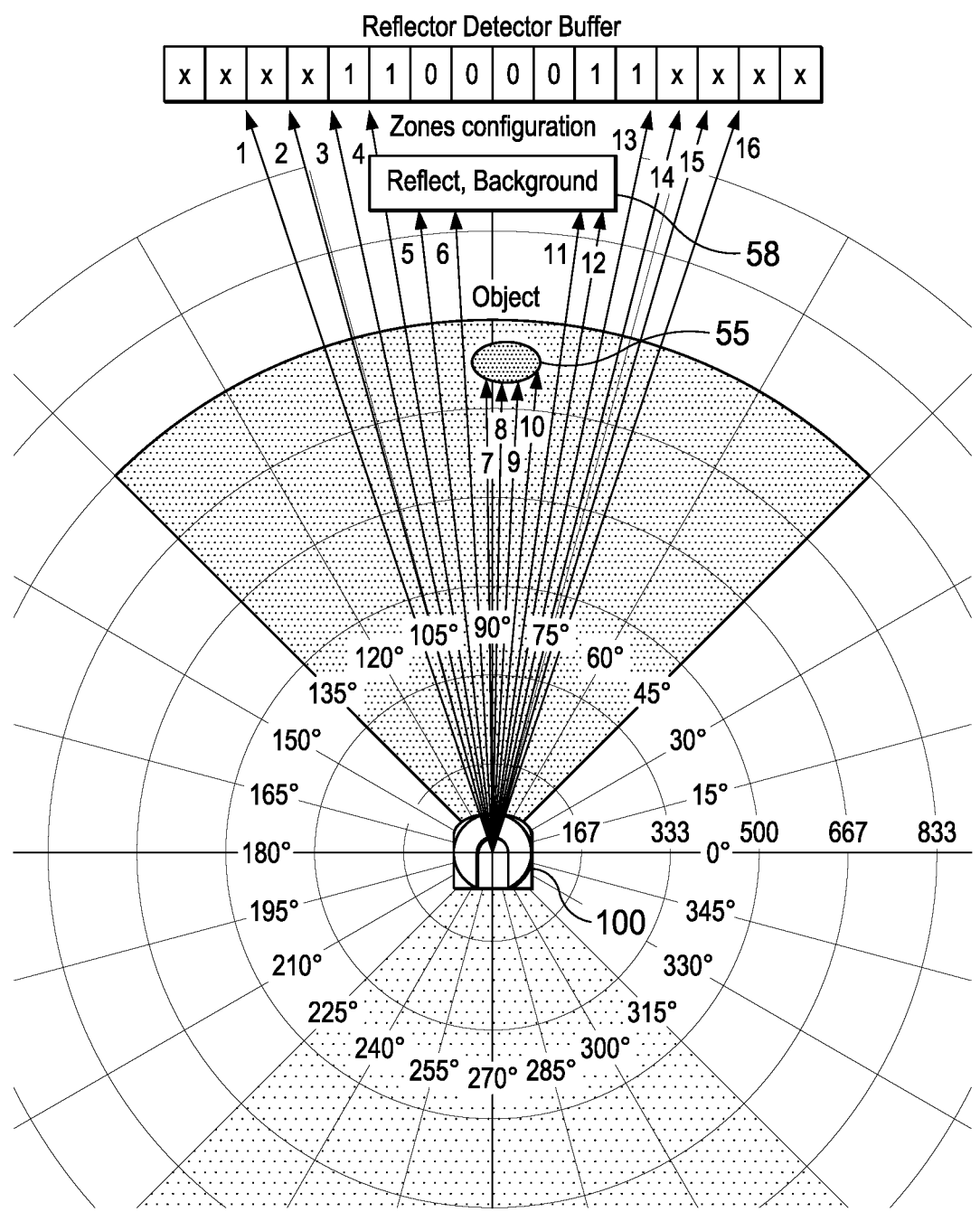
FIGS. 12 and 13 are coverage charts showing different scenarios for detecting the objects and corresponding measurement shift registers.

Therefore, using this method to the i=1 new values of $<rd, e>_{i=1, ch=*}$ (simultaneously for all channels) the FPGA 306 may determine whether the target is reflective or diffusive. As a result, a reflector detector buffer may be generated with setting a bit value=1 in case of a reflective object, otherwise a '0' may be set (see FIG. 11). Thus, a representation of the scenario as in FIG. 7 is determined and, in this way, the potentially dangerous situation may be detected. Conceptually this kind of data buffering can be considered as a digital/numeric representation of the laser beam sequence as shown in FIG. 12.

The characterization of the energy measurements (e.g., FIGS. 9-10, typical for the SLS and obtained by empirical data) may distinguish the target typology between reflective or diffusive. The curves shown in FIG. 10 in the case of "decider" select the auxiliary channel. The curves represent the relation between the distance (x-axis) and the energy$_{ch=Rifl}$ ($e_{ch=Rifl}$) values of the reflective target 1000% (line 1010), diffusive target 90% (line 1020), diffusive target 18% (1030). As described in FIG. 10, a threshold energy value (line 1040, ThEner) is shown that enables the decider to univocally recognize between the reflective target ($e_{i=1, ch=Rifl}$>ThEner) and the diffusive target ($e_{i=1,ch=Rifl}$<ThEner) throughout the safety operation range distance. The algorithm (e.g., reflector detector block) may compare the energy value of the "Reflective Channel", in the buffer cell i=1, with the energy threshold value (ThEner) by determining if the measured value is related to a reflective target or a diffusive target.

Figure 9:
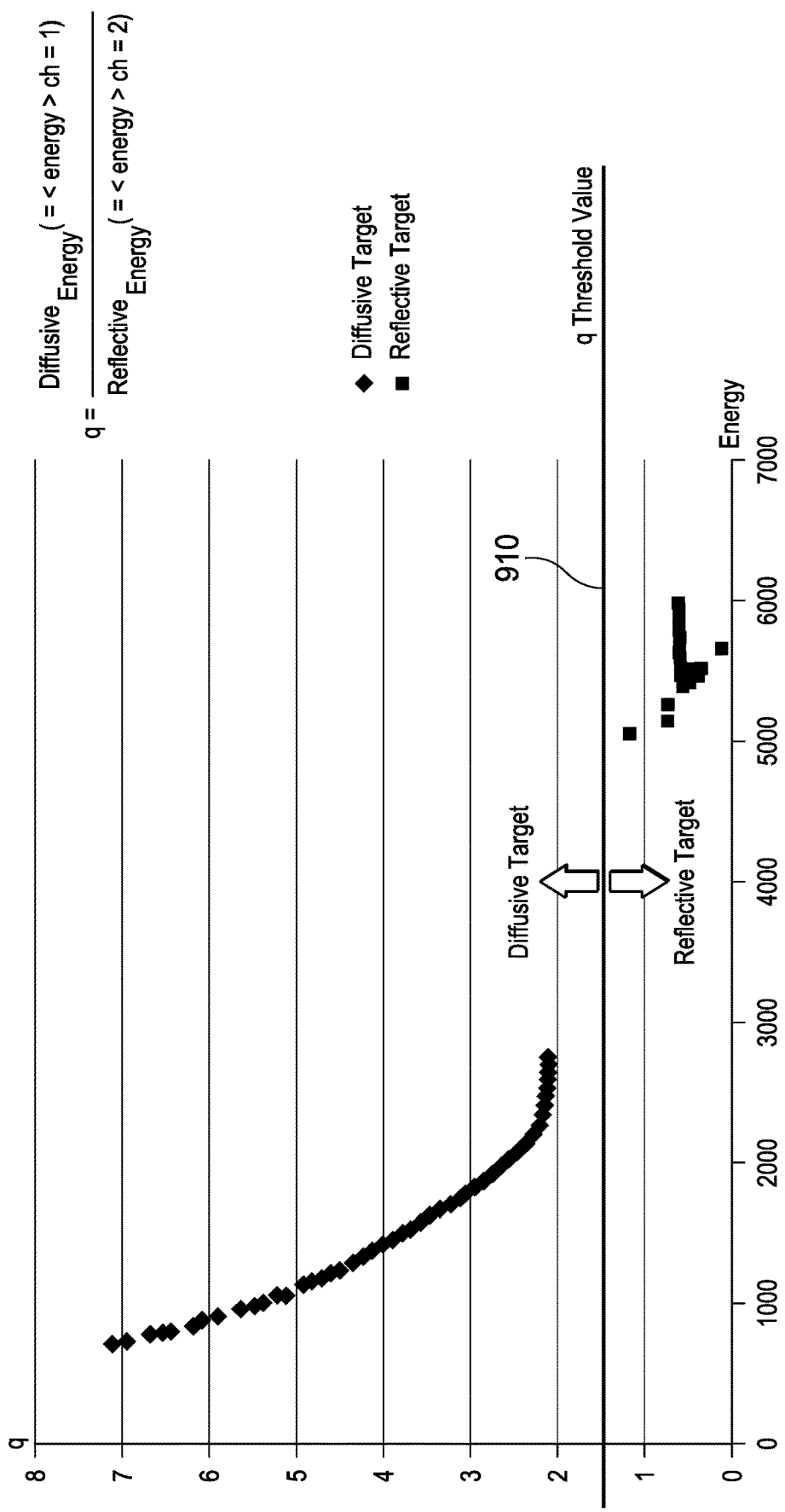
FIG. 9 is a graph for an energy threshold value according to an embodiment of the disclosure.
Figure 10:
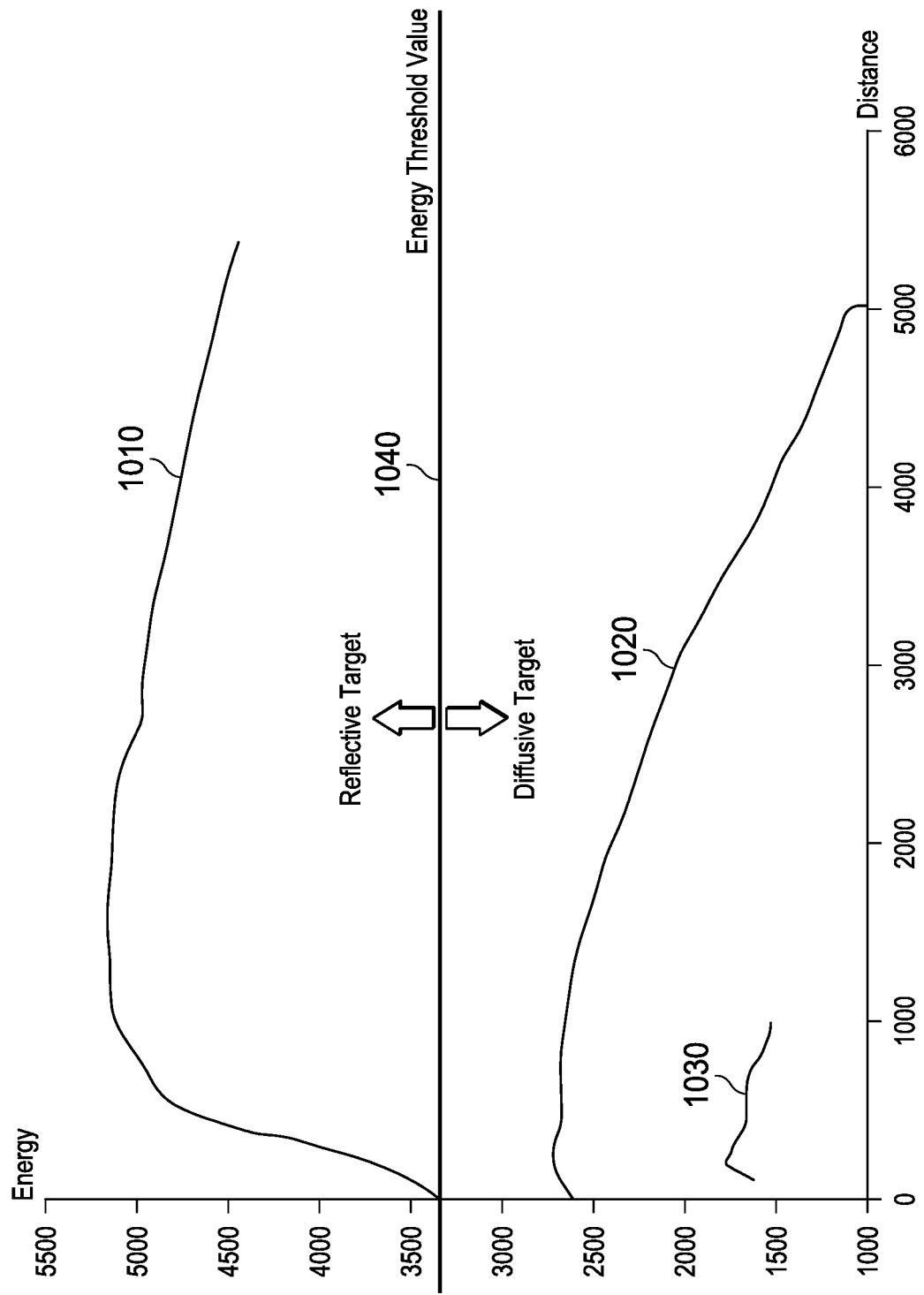
FIG. 10 is a graph of a characteristic curve of an energy value ration according to embodiments of the disclosure.

In the case of the Diffusive Channel or Reflective Channel have been selected by the decider, the graph in FIG. 9 may be utilized. The y-axis represents the energy ratio q=($e_{ch=Diff}$)/($e_{ch=Rifl}$) and the x axis the distance. Even in this case, a threshold value may be identified (line 910, qThr) that allows the decider to distinguish between the diffusive target (data above line 910) and the reflective target (data below line 910). The algorithm ("reflector detector" block) calculates the q value using the energy values of Diffusive and Reflective Channel (in buffer cell i=1) and, as in the previous case, compare it to the threshold qThr value (q>qThr→ diffusive target, q<qThr reflective target) to identify the target typology.

Looking for possible scenarios that will trigger the measurement correction, the following minimum pattern has been identified as an example: 1111 0000 1111. In this representation, the minimum diffusive object (='0000') may include 4 consecutive laser beams ($N_{Diff\_Min}$=4→0.1°*$N_{Diff\_Min}$=0.4°, minimum angular size of the object for the pattern matching) and on both side the minimum reflective object size (='1111') of 4 rays ($N_{Rifl\_min}$=4, as before) 0.4°. This minimum pattern may enable a possible undesired triggering (e.g., false positive activation) to be avoided.

In this case, considering the maximum buffer length $N_{Buff}$=24 an example maximum possible pattern has been deduced: 1111 0000 0000 0000 0000 1111 The maximum diffusive object (='0') may enable the data processing to be:

$$N_{Diff\_Max}=N_{Buff}-(2*N_{Rifl\_Min})=16 \text{ laser beam } (1.6° \text{ maximum angular size}).$$

Considering various different environment scenarios monitored by the SLS the data processing pattern matching also takes in account potential intermediate cases, such as: 1111 0000 1111 0000 1111 0000 (recursive scenario) or 1111 0000 1̲100 0000 0000 1111 (intermediate spurious reflective beam).

Therefore, by analyzing the reflector detector buffer, the matching pattern described above may be determined, and consequently trigger the correction of the distance measurement.

Figure 13:
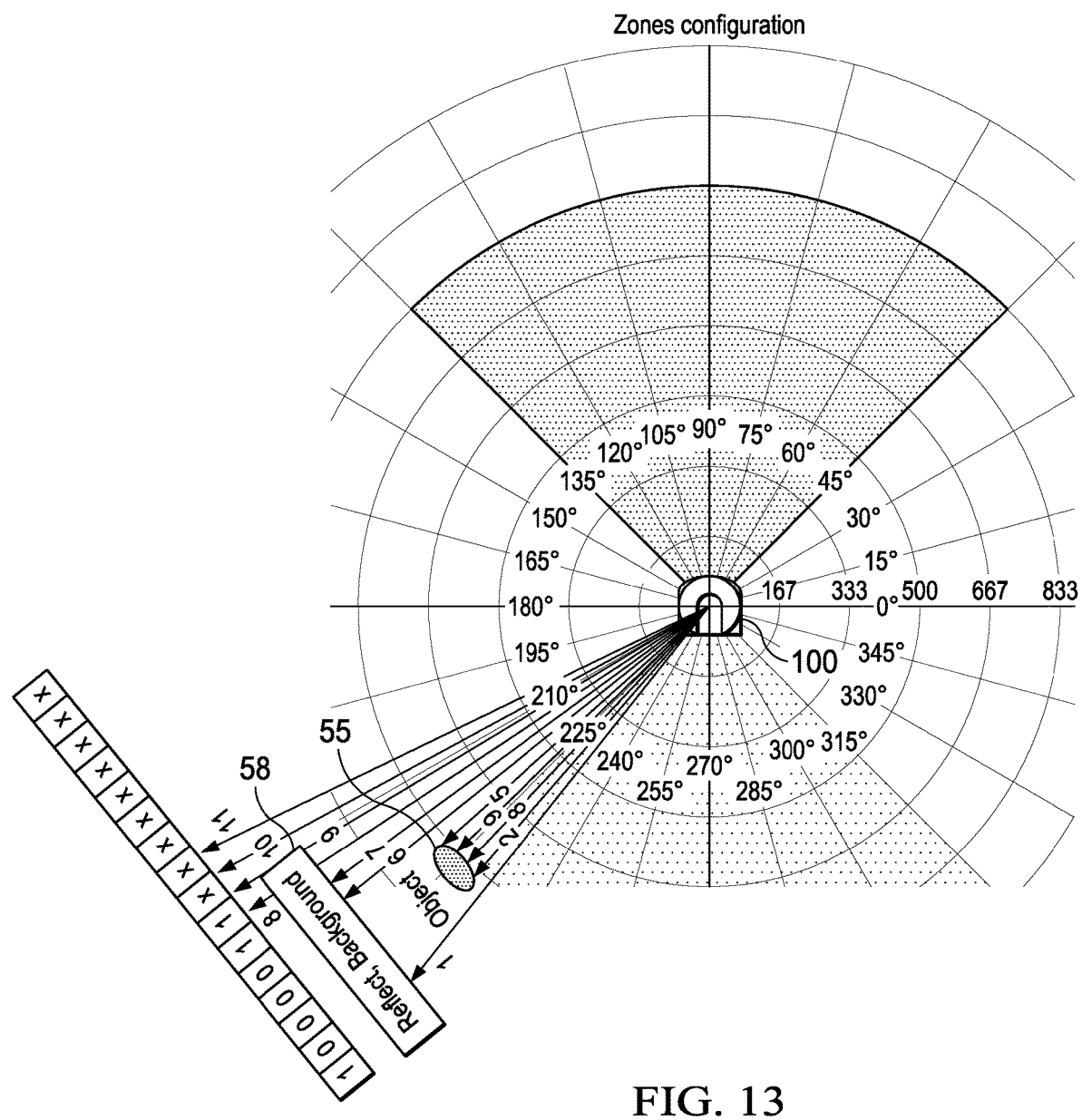
Figure 14:
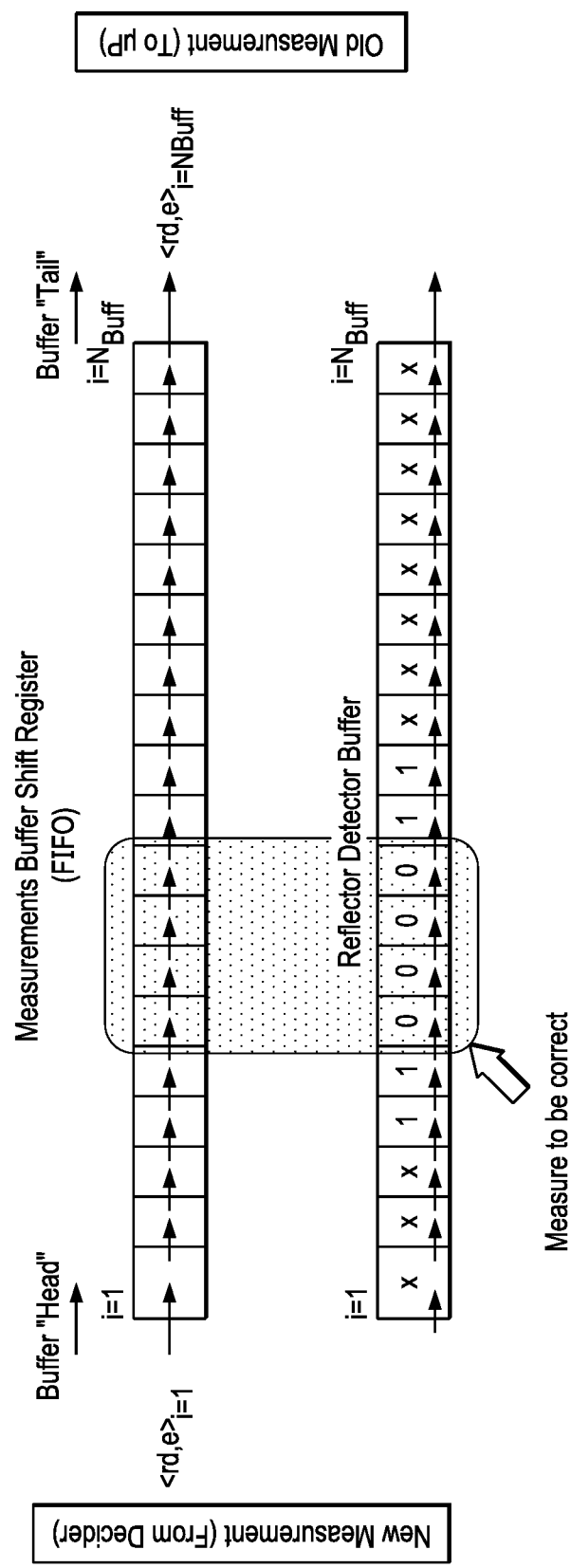

A boundary-effect, at the first angles (from 0° to 0.4° (b.c.)/2.2° (w.c.)) (see FIG. 13), can occur in the case of reflective background partially outside of the SLS scan area. In this case, despite the presence of the reflective background and therefore the corruption of the distance, measurement correction may not be enabled (false negative) as there may not be a pattern match.

These potential scenarios (no trigger conditions) may be as follows:
 a. "11100001111x" (reflective background partially outside the scan area)
 b. "00001111xxxx" (one side of the reflective background outside the scan area (best case(b.c.))
 c. "111000000000000000000011" (boundary-effect worst-case(w.c.))

There may be no boundary effects at the last angles 275°) because extra laser pulses (and consequently extra measurements) are generated consecutively at the last nominal angle (see FIG. 13), which may enable monitoring of an extra area and then successfully processing the boundary scenarios as described above.

Adjusting Distance Measurements

Once the target reflector trigger pattern is recognized, the correction acts on the measures in the buffer corresponding to the position (i-th element) of diffusive object (bit='0' in "reflector detector buffer") by changing the energy value while the raw distance is left intact.

Figure 15:
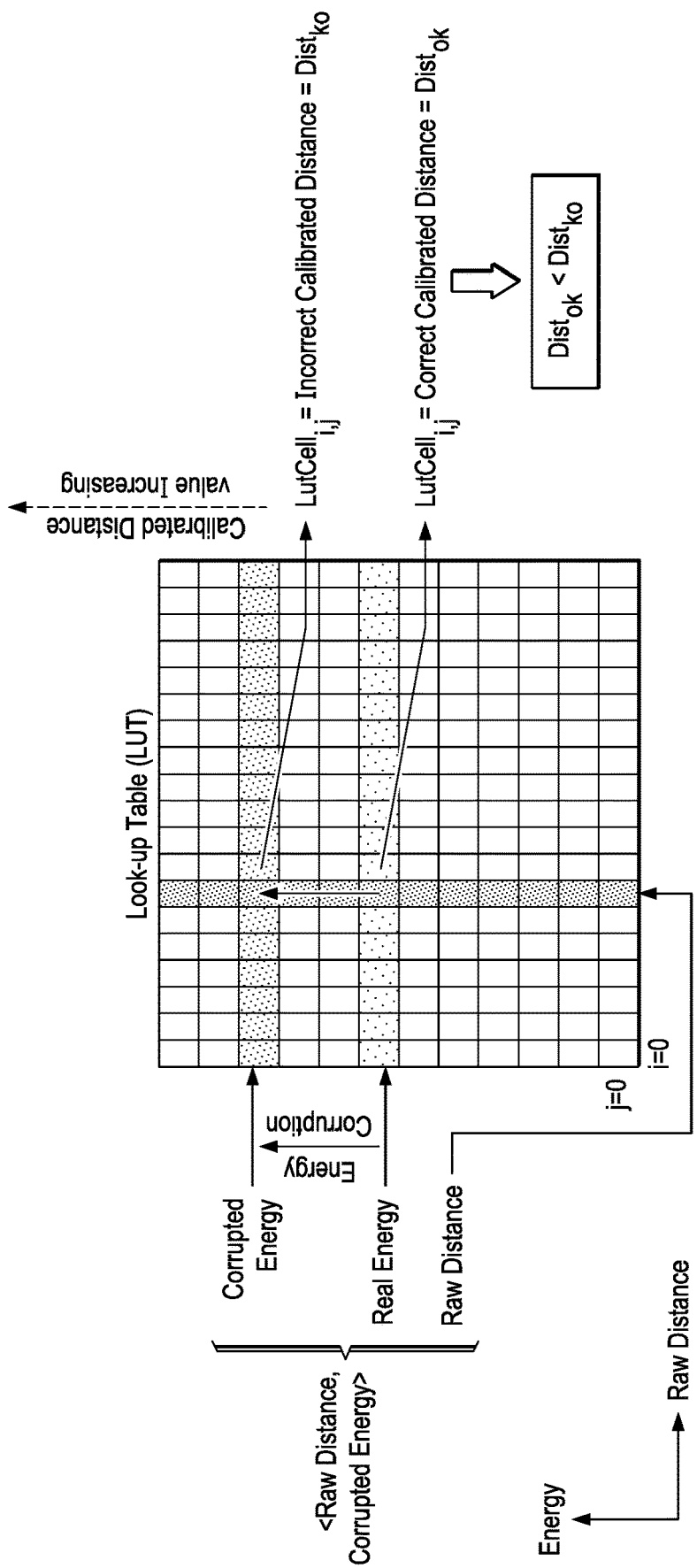
FIGS. 15 and 16 show LUT addressing to compensate for detecting a reflective background according to an embodiment of the disclosure.

Indeed, in the pair of values <rd, e> the effect of reflective background is mainly on the corruption of the energy factor (> of the real value of energy), while the corruption of the raw distance value is negligible. This affects the LUT addressing, and causes a corrupted final distance> correct distance (see FIG. 15).

Figure 16:
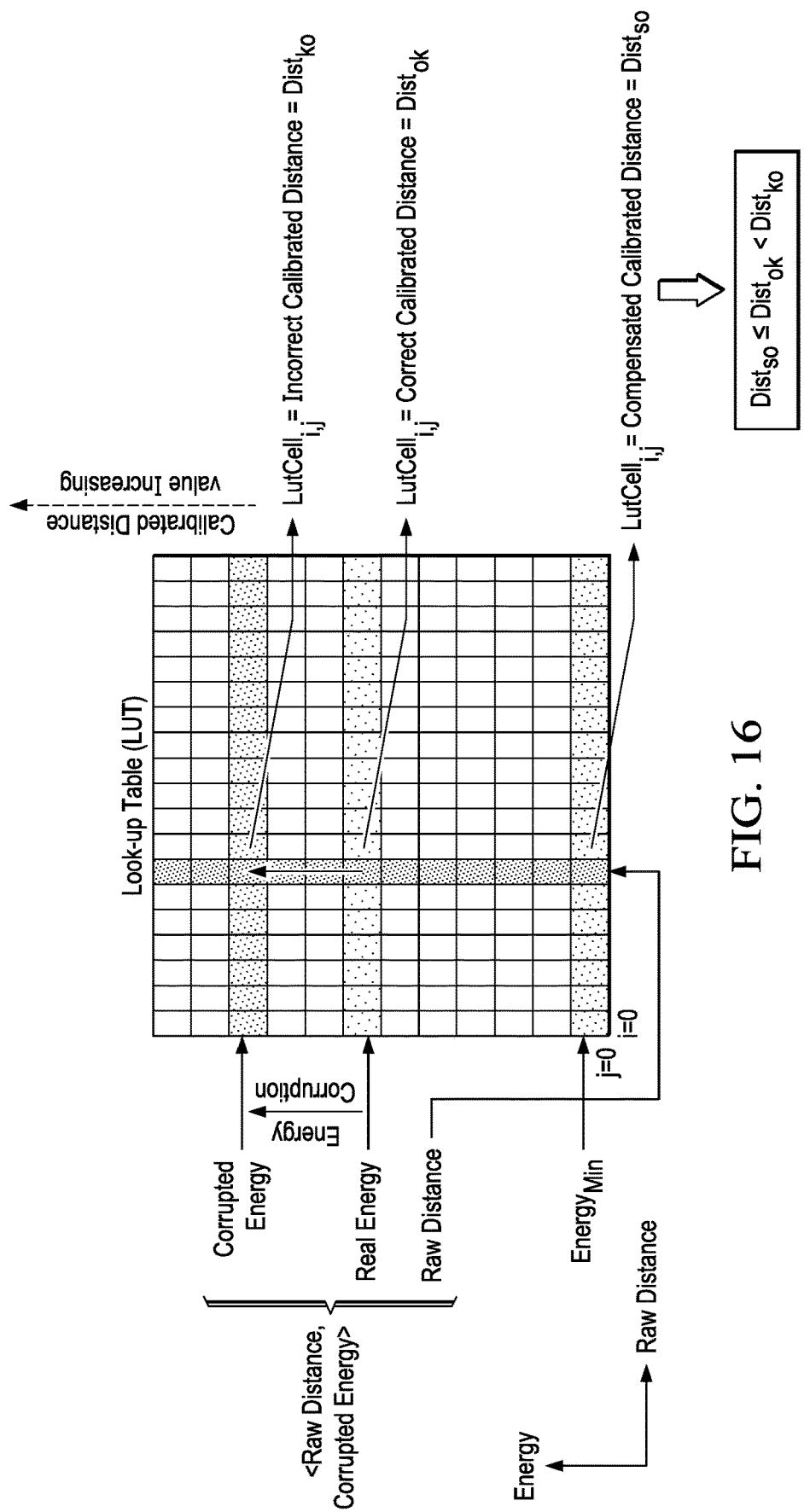

In order to adjust the measure of final distance in a safety-oriented way and considering that in the event of corruption of the measurement by the reflective background the real energy is an unknown value, the corrupted energy value may be replaced with a conventional constant value energy$_k$. Thus, the values <raw distance, energy$_k$> may replace <raw distance, corrupted energy> in order to forcing a proper cell in the LUT. As a result, energy$_k$=energy$_{Min}$, in this way the cell index <i=raw Distance, j=energy$_{min}$> and therefore the $LUT_{i=rawDistance, j=0}$ value that represents the minimum distance possible relates to the specific value of raw distance in the LUT calibrated measurement space (FIG. 16).

Figure 17:
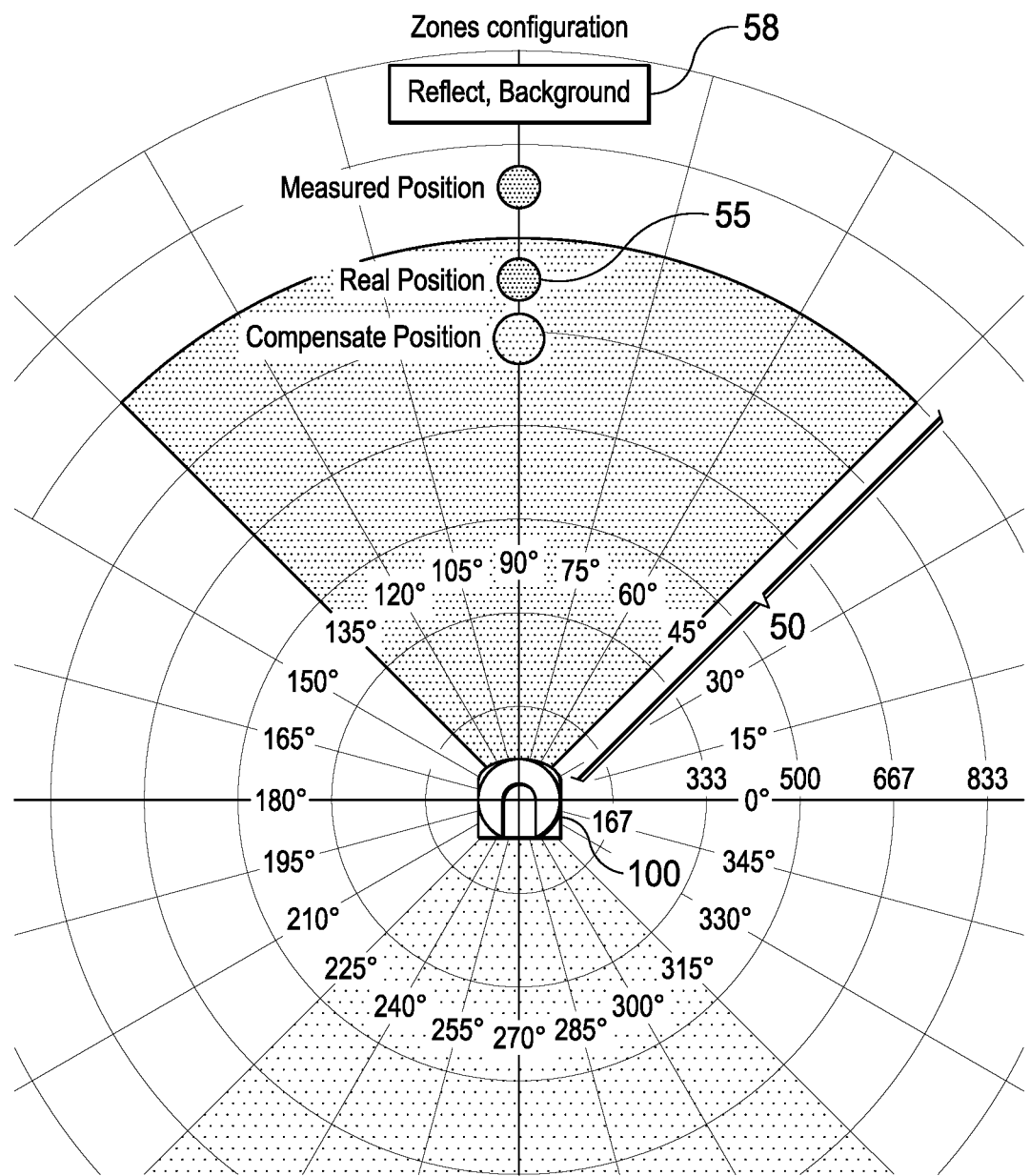
FIGS. 17-19 show coverage charts for different scenarios and compensation adjustments made to correct the position of the scanned object in a safety-oriented way.

In the absence of the possibility to assess the measurement of the real distance due to the corruption effect of the reflective background, this processing of the measures enables the position of the scanned object to be corrected in a safety-oriented way (see FIG. 17). Once the target scenario is detected (e.g., reflective or diffusive), the distance measurement adjustment works to avoids the potential safety-critical situation of an incorrectly assessed object outside the safety area, thereby ensuring that the object position is always within this area.

Figure 18:
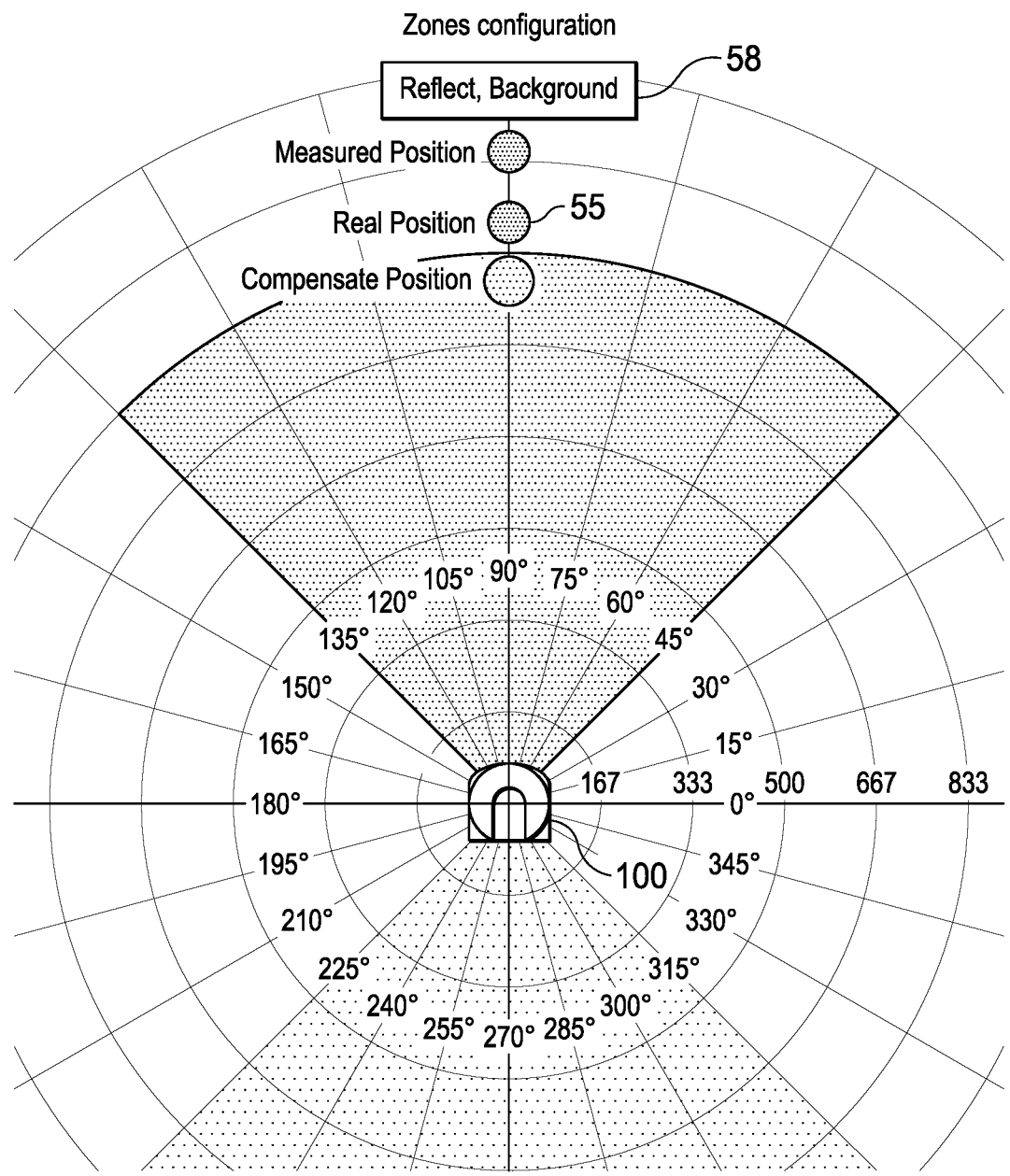

A possible side effect can occur when (as in FIG. 18) the real position of the object is right outside the safety area in front of a reflective background. In this case the SLS may incorrectly enable the OSSD output because the compensate position of the object appear inside the area (i.e., a false positive). This effect is related to the Δe=energy$_{Real}$−energy$_k$ value and as result, in our case (energy$_k$=energy$_{Min}$), is most noticeable for objects with a high reflectance coefficient (e.g., about 60% to 90%) because the Δe reach its maximum value; for the same reason this side effect becomes negligible for object with low reflectance. On the other hand, using energy$_k$=energy$_{Min}$ this false positive event is oriented toward a safe condition, so it may not be critical behavior for the device's safety functionality.

The data processing described above may enable to remove the "additional distance" value; nevertheless, in order to take into account all the possible side effects arising from the heterogeneous scenarios, using this data processing a residual additional distance (e.g., 15 cm, 20 cm, etc.) may be reduced compared to conventional methods (e.g., 40 cm). As an example, an additional distance equal to 20 cm may result in a 50% improvement in the value of additional distance compared to the actual value of 40 cm.

Graphical User Interface—Reflective Background Warning

Figure 19:
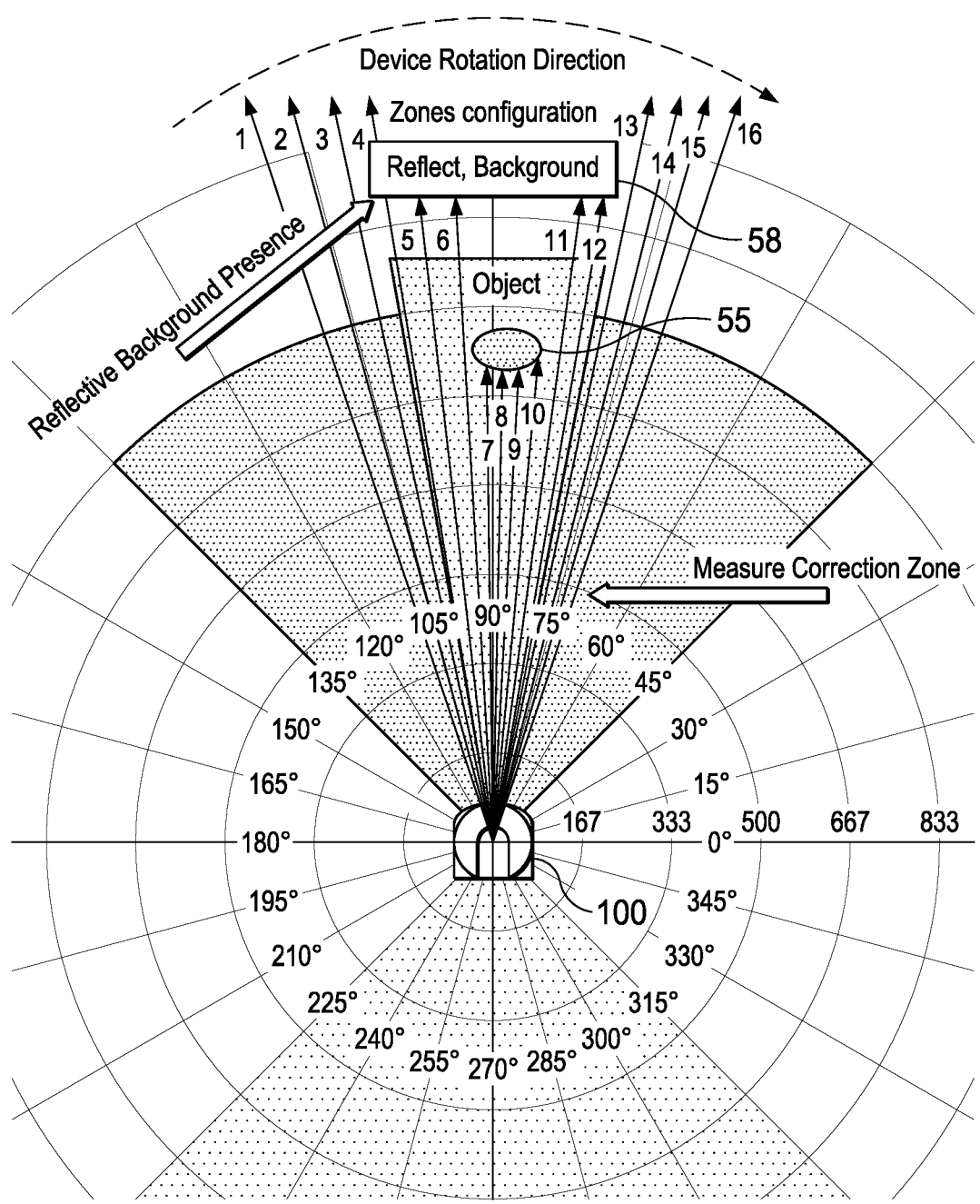

This measurement correction can be shown in real-time on a Graphical User Interface (GUI) of the SLS device using a highlighted area (e.g., yellow area) to alert the customer about the presence in the environment scenario of potential dangerous conditions. A measurement correction warning message can also be viewed in the SLS display. GUI may also be configured to highlight (e.g., green area) the presence in the scenario of reflective backgrounds regardless of whether the measurement correction is enabled. FIG. 19 is an example view of a graphical image that may be displayed on such a GUI.

Additional non-limiting embodiments include:

Embodiment 1. A distance measuring device comprising: a transmitter configured to generate a light pulse; a receiver connected to different amplification channels; and a controller operably coupled with the receiver to receive the different amplification channels, wherein the controller includes: a time of flight core configured to determine time of flight information for the light pulse; and a decider block configured to determine a measurement correction value for the device based on a determination of a presence of a reflective background that is different than a measurement correction value selected for the device when there exists a diffuse background or an absence of a background into a reading field.

Embodiment 2. The device of Embodiment 1, wherein the controller includes: a measurement buffer wherein each cell includes distance and energy values calculated for each pulse and for each channel with stored values corresponding to consecutive transmitted pulses; and a reflector detector buffer wherein each cell includes a binary value indicating the presence of a reflective or diffusive object, each binary value being computed using the information included in more than one measurement buffer.

Embodiment 3. The device of Embodiment 1 or Embodiment 2, wherein the decider block is configured to detect the presence of the reflective background based on selecting data from a different channel for analysis.

Embodiment 4. The device of any of Embodiments 1 through 3, wherein the different amplification channels includes at least one of an auxiliary channel, a diffusive channel, and a reflective channel.

Embodiment 5. The device of Embodiment 4, wherein the auxiliary channel is defined for distances from a minimum distance up to 2500 mm and a target reflectance from 1.8% to 90%.

Embodiment 6. The device of Embodiment 4 or Embodiment 5, wherein the diffusive channel is defined for distances from 2000 mm up to a maximum distance and a target reflectance from 1.8% to 90%.

Embodiment 7. The device of any of Embodiments 4 through 6, wherein the reflective channel is defined for distances from a minimum distance up to a maximum distance and a target reflectance greater than 90%.

Embodiment 8. The device of any of Embodiments 1 through 7, wherein the receiver is a photodetector.

Embodiment 9. The device of any of Embodiments 1 through 8, wherein the decider block is configured to determine the measurement correction value for the device responsive to determining an energy threshold value.

Embodiment 10. The device of any of Embodiments 1 through 9, wherein the decider block is configured to determine the measurement correction value for the device responsive to determining a characteristic curve of an energy value ration of a diffusive channel and a reflective channel.

Embodiment 11. The device of any of Embodiments 1 through 10, wherein the decider block is configured to determine the measurement correction value for the device responsive to a mix method of determining both an energy threshold value and determining a characteristic curve of an energy value ration of a diffusive channel and a reflective channel.

Embodiment 12. The device of any of Embodiments 1 through 11, wherein the decider block is configured to determine the measurement correction value based on a look-up table.

Embodiment 13. The device of Embodiment 12, wherein he look-up table is addressable based on an energy value and raw distance pair received from the time-of-flight core for the selected channel.

Embodiment 14. The device of any of Embodiments 1 through 13, wherein the time-of-flight core and the decider block are implemented in an FPGA of the controller.

Embodiment 15. The device of any of Embodiments 1 through 14, wherein the device is a safety laser scanner.

Embodiment 16. The device of any of Embodiments 1 through 15, wherein the device is a time-of-flight distance measurer without a scanning mechanism.

Embodiment 17. The device of any of Embodiments 1 through 16, wherein the light pulses include laser pulses.

Embodiment 18. A method of measuring a distance of an object with a reflective background, the method comprising: generating a light pulse with a transmitter; determining time of flight information with a time of flight core of a controller that receives different amplification channels via a receiver; and determining, via a decider block of the controller, a measurement correction value for the device based on a determination of a presence of a reflective background that is different than a measurement correction value selected for the device when there exists a diffuse background or an absence of a background into a reading field.

Embodiment 19. The method of Embodiment 18, wherein determining the measurement correction value is responsive to at least one of: determining an energy threshold value; determining a characteristic curve of an energy value ration of a diffusive channel and a reflective channel; or responsive to a mix method of determining both an energy threshold value and determining a characteristic curve of an energy value ration of a diffusive channel and a reflective channel.

Embodiment 20. The method of Embodiment 18 or Embodiment 19, wherein determining the measurement correction value is based on a look-up table.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the disclosure. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of various preferred embodiments for implementing the disclosure, and the scope of the invention should not necessarily be limited by this description. The scope of the present invention is instead defined by the claims.

What is claimed:

1. A distance measuring device comprising:
   a transmitter configured to generate a light pulse;
   a receiver connected to different amplification channels; and
   a controller operably coupled with the receiver to receive the different amplification channels, wherein the controller includes:
   a time of flight core configured to determine time of flight information for the light pulse;
   a decider block configured to determine a measurement correction value for the device based on a determination of a presence of a reflective background that is different than a measurement correction value selected for the device when there exists a diffuse background or an absence of a background into a reading field;
   a measurement buffer wherein each cell includes distance and energy values calculated for each pulse and for each channel with stored values corresponding to consecutive transmitted pulses; and
   a reflector detector buffer wherein each cell includes a binary value indicating the presence of a reflective or diffusive object, each binary value being computed using the information included in more than one measurement buffer.

2. The device of claim 1, wherein the decider block is configured to detect the presence of the reflective background based on selecting data from a different channel for analysis.

3. The device of claim 1, wherein the different amplification channels are characterized by an operating range of distance and target reflectance which includes at least one of an auxiliary channel, a diffusive channel, and a reflective channel.

4. The device of claim 3, wherein the auxiliary channel is defined for distances from a minimum distance up to 2500 mm and a target reflectance from 1.8% to 90%.

5. The device of claim 3, wherein the diffusive channel is defined for distances from 2000 mm up to a maximum distance and a target reflectance from 1.8% to 90%.

6. The device of claim 3, wherein the reflective channel is defined for distances from a minimum distance up to a maximum distance and a target reflectance greater than 90%.

7. The device of claim 1, wherein the receiver is a photodetector.

8. The device of claim 1, wherein the decider block is configured to determine the measurement correction value for the device responsive to determining an energy threshold value.

9. The device of claim 1, wherein the decider block is configured to determine the measurement correction value for the device responsive to determining a characteristic curve of an energy value ratio of a diffusive channel and a reflective channel.

10. The device of claim 1, wherein the decider block is configured to determine the measurement correction value for the device responsive to a mix method of determining both an energy threshold value and determining a characteristic curve of an energy value ratio of a diffusive channel and a reflective channel.

11. The device of claim 1, wherein the decider block is configured to determine the measurement correction value based on a look-up table.

12. The device of claim 11, wherein he look-up table is addressable based on an energy value and raw distance pair received from the time-of-flight core for the selected channel.

13. The device of claim 1, wherein the time-of-flight core and the decider block are implemented in an FPGA of the controller.

14. The device of claim 1, wherein the device is a safety laser scanner.

15. The device of claim 1, wherein the device is a time-of-flight distance measurer without a scanning mechanism.

16. The device of claim 1, wherein the light pulses include laser pulses.

17. A method of measuring a distance of an object with a reflective background, the method comprising:
generating a light pulse with a transmitter;
determining time of flight information with a time of flight core of a controller that receives different amplification channels via a receiver;
determining, via a decider block of the controller, a measurement correction value for the device based on a determination of a presence of a reflective background that is different than a measurement correction value selected for the device when there exists a diffuse background or an absence of a background into a reading field;
receiving, in one or more cells of a measurement buffer, distance and energy values calculated for each pulse and for each channel with stored values corresponding to consecutive transmitted pulses; and
setting, in one or more cells of a reflector detector buffer, a binary value indicating the presence of a reflective or diffusive object, each binary value being computed using the information included in more than one measurement buffer.

18. The method of claim 17, wherein determining the measurement correction value is responsive to at least one of:
determining an energy threshold value;
determining a characteristic curve of an energy value ratio of a diffusive channel and a reflective channel; or
responsive to a mix method of determining both an energy threshold value and determining a characteristic curve of an energy value ratio of a diffusive channel and a reflective channel.

19. The method of claim 17, wherein determining the measurement correction value is based on a look-up table.

20. A distance measuring device, wherein the device is a laser scanner having a scanning area, comprising:
a light source configured to generate a light pulse;
a photodetector configured to receive light scattered back from an object within the scanning area, the photodetector being connected to different amplification channels and each of the channels being characterized by an operating range of distance and target reflectance; and
a controller operably coupled with the photodetector and configured to receive the different amplification channels, wherein the controller includes:
a time of flight core configured to determine time of flight information for the light pulse;
a decider block operably coupled to the time of flight core and configured to determine a measurement correction value for the device based on a determination of a presence of a reflective background that is different from a measurement correction value selected for the device when there exists a diffuse background or an absence of a background within a reading field;
a measurement buffer having a plurality of buffer cells for each amplification channel with stored values corresponding to consecutive transmitted pulses from the light source, wherein each cell includes a respective pair of distance and energy values calculated for each laser pulse, the decider block being configured to evaluate the pairs of distance and energy values; and
a reflector detector buffer having a plurality of buffer cells, wherein each cell includes a binary value set to indicate the presence of a reflective or of a diffusive object, each binary value being computed using the information included in more than one measurement buffer,
wherein the decider block is configured to select a pair of values to detect the presence of the reflective background based on the selected data.

* * * * *